US012767184B1

(12) United States Patent
Zhang et al.

(10) Patent No.: US 12,767,184 B1
(45) **Date of Patent: *Oct. 20, 2026**

(54) STORING A PREDICTED OBJECT TRAJECTORY USING A LINEAR ARRAY

(71) Applicant: Zoox, Inc., Foster City, CA (US)

(72) Inventors: Linjun Zhang, Foster City, CA (US); Marin Kobilarov, Baltimore, MD (US)

(73) Assignee: Zoox, Inc., Foster City, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 18/194,437

(22) Filed: Mar. 31, 2023

(51) Int. Cl.
*B60W 60/00* (2020.01)

(52) U.S. Cl.
CPC ...... *B60W 60/0027* (2020.02); *B60W 60/001* (2020.02)

(58) Field of Classification Search
CPC ........... B60W 2420/403; B60W 10/08; B60W 60/001; B60W 30/09; B60W 2556/50; B60W 30/0956; B60W 10/20; B60W 20/00; B60W 60/0015; B60W 2554/00; B60W 60/0011; B60W 50/0097; B60W 30/18163; B60W 2552/53; B60W 2554/80; B60W 30/12; B60W 60/0027; B60W 30/095; B60W 50/10; B60W 60/0059; B60W 60/00; B60W 2540/215; B60W 30/10; B60W 60/00186
USPC ........................................................... 701/25
See application file for complete search history.

(56) References Cited

U.S. PATENT DOCUMENTS

| | | | | |
|---|---|---|---|---|
| 2018/0150081 | A1* | 5/2018 | Gross | G01C 21/3446 |
| 2018/0196437 | A1 | 7/2018 | Herbach et al. | |
| 2020/0393567 | A1 | 12/2020 | Schroeter | |
| 2021/0403056 | A1* | 12/2021 | McGill | G06N 3/0464 |
| 2023/0350820 | A1 | 11/2023 | Manson et al. | |
| 2023/0391374 | A1 | 12/2023 | Chen et al. | |
| 2024/0043020 | A1 | 2/2024 | Rosman et al. | |

OTHER PUBLICATIONS

Office Action for U.S. Appl. No. 18/194,461 dated Jan. 10, 2025, 86 pages.

* cited by examiner

*Primary Examiner* — Khoi H Tran
(74) *Attorney, Agent, or Firm* — Lee & Hayes, P.C.

(57) ABSTRACT

Techniques for storing predicted state using a linear array and for querying the linear array to evaluate a proposed trajectory are described herein. In some cases, a first processing unit (e.g., a central processing unit (CPU)) determines prediction data associated with an object in the vehicle environment and sends the prediction data to a second processing unit (e.g., a graphics processing unit (GPU)). In some cases, after the second processing unit receives the prediction data, the second processing unit stores the prediction data using a linear array. In some cases, the second processing unit can use the linear array to evaluate a proposed trajectory for the vehicle and determine whether to validate the proposed trajectory for the vehicle. In some cases, based on the validation of the proposed trajectory by the second processing unit, the vehicle is controlled based on the proposed trajectory.

20 Claims, 6 Drawing Sheets

STORING A PREDICTED OBJECT TRAJECTORY USING A LINEAR ARRAY

BACKGROUND

Autonomous vehicles evaluate proposed trajectories to determine optimal actions for safely controlling the vehicle in an environment and proximate other objects. However, evaluating proposed trajectories needs to be fast and responsive, which can present challenges when controlling the autonomous vehicle through an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
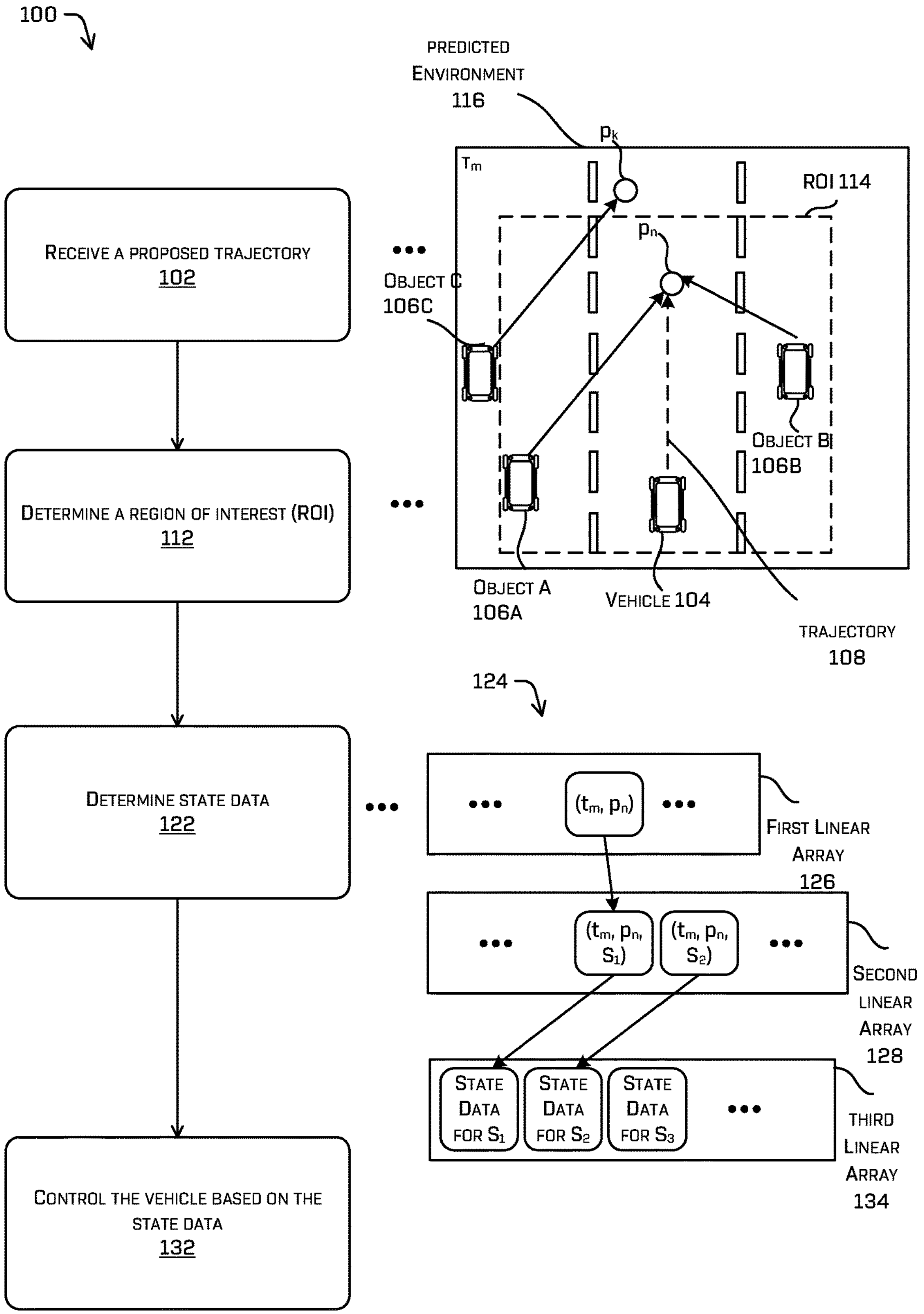
FIG. 1 is a flowchart diagram of an example process for controlling a vehicle by querying state data associated with an object in the vehicle environment.

Techniques for controlling a vehicle by querying state data associated with an object in the vehicle environment are discussed herein. The described techniques may be used to determine an optimal trajectory for the vehicle to increase the likelihood that the vehicle is operated in compliance with relevant traffic regulations and navigates safely with respect to other objects in the vehicle environment. Tracking objects and evaluating their impact on operation of an autonomous vehicle requires computational resources. Increased use of computational resources may be associated with increased latency which, in turn, may result in either a limitation of the number of objects which can be evaluated and/or potentially unsafe operation due to the delayed data. Accordingly, the techniques discussed herein may improve the safety of occupants of an autonomous vehicle that incorporates the techniques discussed herein by reducing the latency associated with consideration of a plurality of objects and/or a plurality of times over vehicle operation. Moreover, the techniques may improve the efficiency of vehicle, such as an autonomous vehicle, in accomplishing a mission such as delivering passengers and/or cargo, surveying a region, or the like by reducing the computational resources required and/or latency associated with such evaluations.

In some cases, a first processing unit (e.g., a central processing unit (CPU)) determines and/or receives prediction data associated with an object in the vehicle environment and sends the prediction data to a second processing unit (e.g., a graphics processing unit (GPU)). For example, the first processing unit may determine the prediction data based on a predicted trajectory for the object, such as based on a segment of the predicted trajectories that falls within a region of interest (ROI) determined within the vehicle environment. In such an example, predictions may be generated based at least in part on sensor data available to the vehicle and include predicted future states associated with detected objects. A subset of such predictions may be determined which lie within some determined region (e.g., as will be discussed in detail herein but may, at a high level, be associated with capabilities of the vehicle and/or objects over some period of time). In some cases, after the second processing unit receives the subset of prediction data, the second processing unit may compute a representation of the prediction data and store the representation as a linear array. In some cases, the second processing unit can use the linear array to evaluate a proposed trajectory for the vehicle and determine whether to validate the proposed trajectory for the vehicle. In some cases, based on (e.g., in response to) the validation of the proposed trajectory by the second processing unit, the vehicle is controlled based on the proposed trajectory.

In some cases, the techniques described herein include determining, for each object that is detected within the vehicle environment, a predicted trajectory. In some cases, a prediction component (e.g., a prediction component of the first processing unit) determines, for each object that is detected within the vehicle environment, a predicted trajectory that represents one or more predicted states of the object across the future (e.g., over one or more future times) and/or a representation (e.g., a heatmap) indicative of future positions. Each predicted state for an object may represent a predicted location of the object at a corresponding future time and/or one or more other predicted attributes of the object at the corresponding future time (e.g., velocity, acceleration, heading, etc.). For example, the ith predicted state for an object may represent that, at an ith future time, the object is predicted to be at a particular location with a particular speed, a particular direction of movement, and a particular acceleration. Accordingly, the predicted trajectory for an object may represent one or more predicted locations of the object across the future.

In some cases, the techniques described herein include determining an ROI within the vehicle environment. In some cases, the ROI represents the boundaries of a region within the vehicle environment that is determined to be of relatively higher importance for the vehicle's trajectory planning purposes, such that an object that falls outside of the ROI may be determined to be of relatively less significance for the vehicle's trajectory planning purposes. In some cases, to determine the prediction data to send to the second processing unit, the first processing unit may select a subset of prediction data at the current time to send to the second processing unit.

In some cases, the ROI is a region that includes the vehicle's current position and a surrounding region. In some cases, the surrounding region is a fixed region around the vehicle's current position, such as a rectangular-shaped region with a fixed set of dimensions centered around the vehicle's current position. In some cases, the surrounding region is determined based on an estimated vehicle occupancy in the future. For example, the surrounding region may be determined based on one or more candidate actions that are available to the vehicle at the current time. In some cases, the ROI is a region (e.g., a region with a particular shape, such as a rectangular shape) that covers the current vehicle position and action references for all of the candidate actions available to the vehicle at the current time with some additional buffer. In various examples, such an ROI may be determined based at least in part on one or more of vehicle dynamics/kinematics and/or surrounding objects. As a non-limiting example of such, the region may be determined based on determining an extent to which the vehicle could potentially travel over a subsequent period of time and/or motion of proximate objects and determining the union thereof. In additional or alternative examples, a set of actions for the vehicle to take may be received (e.g., turn left, turn right, continue straight, merge left, merge right, slow down, speed up, etc.). The region may be determined based at least in part on the one or more actions received. In such an example, the region may include those portions of the environment which may be traversed by the vehicle if such actions were performed (which, at least in some examples, may be regardless of objects proximate the vehicle).

In some cases, the techniques described herein include determining prediction data for transmission to the second processing unit based on one or more predicted trajectories for one or more objects within the vehicle environment. In some cases, the first processing unit determines the prediction data based on predicted trajectories for any objects in the vehicle environment that are located within the ROI. In some cases, the first processing unit determines the prediction data by sampling from the predicted trajectories for objects in the vehicle environment that are located within the ROI. The output of the sampling may be one or more sampled states, where each sampled state may represent that a corresponding object is predicted to have a particular state at a corresponding future time. In various examples, the ROI may also be based at least in part on a heading of the object. For example, the ROI may be determined to exclude an object proximate the vehicle but moving away from the vehicle.

In some cases, the first processing unit samples from predicted trajectories for one or more objects in the ROI to determine prediction data for transmission to the second processing unit. In some cases, the objective behind sampling predicted trajectories and determining the prediction data based on objects in the ROI is to reduce the prediction data's size relative to the predicted trajectories' size. Reducing the size of prediction data may be important to facilitate storage of the prediction data on the second processing unit, because the second processing unit may have less storage capacity than the first processing unit. Accordingly, storing all of the predicted trajectories for all objects in the vehicle environment on the second processing unit may be unfeasible, impractical, and/or undesirable. For example, the first processing unit may be a CPU and the second processing unit may be a GPU that, while faster than the CPU, has less storage capacity/accessible memory. Accordingly, the first processing unit may perform one or more operations to reduce the size of the prediction data sent to the second processing unit. For example, the first processing unit may sample from predicted trajectories and determine the prediction data based on sampled predicted trajectories. As another example, the first processing unit may determine the prediction data based on predicted trajectories for objects whose current locations fall within the determined ROI. As a further example, the first processing unit may determine the prediction data by sampling from predicted trajectories for objects whose current locations fall within the determined ROI.

In some cases, to sample from a predicted trajectory of an object within the ROI, the first processing unit selects predicted states of the predicted trajectory that are associated with predefined future times. For example, the first processing unit may select a predicted state from the predicted trajectory every 0.10 seconds. In some cases, the predefined future times at which predicted trajectories are sampled align with times at which proposed trajectories are evaluated. For example, in some cases, if the second processing unit is configured to evaluate proposed trajectories at times {0.6 s, 1.6 s, 2.6 s, . . . }, then the first processing unit may be configured to sample predicted trajectories at times {0.6 s, 1.6 s, 2.6 s, . . . }. As another example, in some cases, if the second processing unit is configured to evaluate proposed trajectories at times {0.6 s, 1.6 s, 2.6 s, . . . }, then the first processing unit may be configured to sample predicted trajectories at times {0.5 s, 1.5 s, 2.5 s, . . . } to allow for a 0.1 s buffer time (e.g., to accommodate transmission latency).

In some cases, the output of sampling from the predicted trajectories of S objects in the vehicle environment across T timesteps is a two-dimensional matrix with the dimensions S×T or T×S. In some cases, to determine the prediction data sent to the second processing unit, the first processing unit flattens the two-dimensional matrix into a one-dimensional array, such as a one-dimensional array having O*T values. In some cases, the first processing unit then sends the one-dimensional array to the second processing unit. In some cases, a value of the one-dimensional array may represent that an object is predicted to be at a particular location and/or have a particular state at a particular future time.

In some cases, the prediction data sent to the second processing unit represent one or more predicted object states for one or more objects in the vehicle environment (e.g., for one or more objects within the ROI of the vehicle environment). In some cases, the prediction data sent to the second processing unit also represents one or more predicted locations for one or more objects in the vehicle environment (e.g., for one or more objects within the ROI of the vehicle environment). For example, the prediction data may represent that a first object (e.g., a first object in the ROI of the vehicle environment) is configured to be at a location $(x_1, y_1)$ and have the state $s_1$ at a first future time step, be at a location $(x_2, y_2)$ and have the state $s_2$ at a second future time step, and in general be at a location $(x_i, y_i)$ and have the state $s_i$ at an ith future time step. In at least some examples, the prediction data may comprise a size associated with the object and/or a buffer around the extents of the object. Accordingly, in some cases, the prediction data may be used at the second processing unit to determine occupancy values and one or more state values. An occupancy value may represent that an object is predicted to occupy a particular cell in the vehicle environment at a future timestep. A state value may represent that an object is predicted to have a particular state at a future timestep.

In some cases, the prediction data sent to the second processing unit represent is used to determine an indication of which objects will occupy the cell in a future time. For example, the prediction data may represent one or more occupancy values, where each occupancy value represents a prediction about which objects (if any) will occupy a respective cell in a respective future time. In some cases, the prediction data can be represented as and/or include a set of T occupancy grids each associated with a respective future time of T future times (e.g., T future timestamps selected based on 0.10 second intervals). In some cases, the occupancy grid for a particular future time represents, for each cell in at least a portion of the vehicle environment, an indication of which objects are predicted to occupy the particular cell at the particular future time. A discrete occupancy grid may be associated with various timesteps. As such, the second processing unit may evaluate the occupancy values for each such timestep based at least in part on the prediction data. Further, because of the parallel nature of the second processing unit, occupancy values for a plurality of objects at a given time may be determined substantially simultaneously.

In some cases, the techniques described herein include determining at least one linear array based on the occupancy values. In some cases, after receiving the prediction data from the first processing unit, the second processing unit determines one or more linear arrays based on the occupancy values. The linear arrays may represent occupancy data and/or state data associated with a set of objects in the vehicle environment (e.g., a set of objects in the ROI). For example, the one or more linear arrays may represent, for each cell in a target region of the vehicle environment (e.g., in the ROI): (i) which of the set of objects (if any) are predicted to occupy the cell in one or more future times associated with the prediction data, and/or (ii) for each object that is predicted to occupy the cell in a respective future time, the predicted state of the object at the respective future time.

In some cases, the second processing unit determines the one or more linear arrays based on one or more state-occupancy records. A state-occupancy record may represent that an object having a respective state may occupy a respective cell of the vehicle environment at a respective future time. For example, consider an example scenario in which a vehicle environment includes four cells $c_1$, $c_2$, $c_3$, and $c_4$, a first object is predicted to occupy $c_1$ and $c_2$ at a first future time $t_1$ and $c_2$ and $c_3$ at a second future time $t_2$, a second object is predicted to occupy $c_2$ at $t_1$ and $c_3$ at the $t_2$, the first object is predicted to have the state $s_1$ at $t_1$ and the state $s_2$ at $t_2$, and the second object is predicted to have the state $s_3$ at $t_1$ and the state $s_1$ at $t_2$. In this example scenario, the following state-occupancy records may be determined: a first record $(t_1, c_1, s_1)$ representing that $c_1$ is predicted to be occupied by an object having the state $s_1$ at $t_1$, a second record $(t_1, c_2, s_1)$ representing that $c_2$ is predicted to be occupied by at least one object having the state $s_1$ at $t_1$, a third record $(t_1, c_2, s_3)$ representing that $c_2$ is predicted to be occupied by at least one object having the state $s_3$ at $t_1$, a fourth record $(t_2, c_2, s_2)$ representing that $c_2$ is predicted to be occupied by at least one object having the state $s_2$ at $t_2$, a fifth record $(t_2, c_3, s_2)$ representing that $c_3$ is predicted to be occupied by at least one object having the state $s_2$ at $t_2$, and a sixth record $(t_2, c_3, s_1)$ representing that $c_3$ is predicted to be occupied by at least one object having the state $s_1$ at $t_2$.

In some cases (e.g., when there is a discrete number of defined states), to determine the one or more state-occupancy records based on the prediction data received from the first processing unit, the second processing unit allocates one parallel process to each defined state that may be assigned to an object in a future timestep by the prediction data. In some of those cases, given S defined states, S parallel processes are initialized. In some cases, each parallel process processes the prediction data to determine state-occupancy records for a respective one of the defined states. For example, consider again the example scenario in which a vehicle environment includes four cells $c_1$, $c_2$, $c_3$, and $c_4$, a first object is predicted to occupy $c_1$ and $c_2$ at a first future time $t_1$ and $c_2$ and $c_3$ at a second future time $t_2$, a second object is predicted to occupy $c_2$ at $t_1$ and $c_3$ at the $t_2$, the first object is predicted to have the state $s_1$ at $t_1$ and the state $s_2$ at $t_2$, and the second object is predicted to have the state $s_3$ at $t_1$ and the state $s_1$ at $t_2$. In this example scenario, if there are four defined states $\{s_1, s_2, s_3, s_4\}$: (i) a first process may process the prediction data associated with the vehicle environment to determine the state-occupancy records $(t_1, c_1, s_1)$, $(t_1, c_2, s_1)$, $(t_1, c_2, s_1)$, and $(t_2, c_3, s_1)$ associated with the respective state $s_1$, (ii) a second process may process the prediction data associated with the vehicle environment to determine the state-occupancy records $(t_2, c_2, s_2)$ and $(t_2, c_3, s_2)$ associated with the respective state $s_3$, (iii) a third process may process the prediction data associated with the vehicle environment to determine the state-occupancy record $(t_1, c_2, s_3)$ associated with the respective state $s_3$, and (iv) a fourth process may process the prediction data associated with the vehicle environment to determine that the respective state $s_4$ is not represented by the prediction data and thus does not need to have a corresponding state-occupancy record.

In some cases, after determining the state-occupancy records, the second processing unit orders the state-occupancy records. In some cases, the second processing unit orders the state-occupancy records based on at least one of future time identifiers, cell identifiers, or state identifiers. For example, in some cases, the second processing unit orders the state-occupancy records based first on time identifiers and second on cell identifiers. For example, in some cases, the second processing unit orders the state-occupancy records in a manner such that: (i) all state-occupancy records associated with a later time are placed after all state-occupancy records associated with an earlier time, (ii) all state-occupancy records associated with a common time are placed one after another (e.g., in a contiguous segment of the sequence), and (iii) an state-occupancy record that is associated with a smaller cell identifier (e.g., as determined based on a sequence of cells) is placed before a state-occupancy record that is associated with the same time but a greater cell identifier.

In some cases, the second processing unit determines three linear arrays based on the prediction data received from the first processing unit: (i) a cell array, (ii) a state identifier array, and (iii) a state data array. Each array element in the cell array represents a combination of a cell in the vehicle environment and a future time, where the prediction data represents that at least one object is predicted to occupy the cell at the future time. For example, suppose a vehicle environment includes four cells $c_1$, $c_2$, $c_3$, and $c_4$, a first object is predicted to occupy $c_1$ and $c_2$ at a first future time $t_1$ and $c_2$ and $c_3$ at a second future time $t_2$, and a second object is predicted to occupy $c_2$ at $t_1$ and $c_3$ at the $t_2$, the first object is predicted to have the state $s_1$ at $t_1$. In that case, the cell array may include the following elements: a first element corresponding to the $(t_1, c_1)$ because an object is predicted to occupy $c_1$ at $t_1$, a second element corresponding to the $(t_1, c_2)$ because two objects are predicted to occupy $c_2$ at $t_1$, a third element corresponding to the $(t_2, c_2)$ because one object is predicted to occupy $c_2$ at $t_2$, and a fourth element corresponding to the $(t_2, c_3)$ because two objects are predicted to occupy $c_3$ at $t_2$. In some cases, the cell array is ordered based on an ordering of future time identifiers and/or an ordering of cell identifiers. For example, in some cases, the cell array is ordered based first on future time identifiers and then on future time identifiers.

In some cases, determining the cell array includes determining, for the set of predicted trajectories, a set of identifiers each comprising a time, a position, and a state identifier, the state identifier indicative of an associated predicted trajectory, and the position comprising a two-dimensional location within a grid defined by the region of interest and determined based at least in part on the associated predicted trajectory. In some cases, determining the cell array includes sorting the set of identifiers based on the time and the position, determining, based at least in part on the set of identifiers, a subset of identifiers having a same time and a same position, and storing, within the linear array, an indication of the subset of identifiers.

In some cases, each element in the state identifier array represents a combination of a cell in the vehicle environment, a future time, and a state identifier, where the prediction data represents that at least one of the objects that are predicted to occupy the cell in the future time is predicted to have the object state corresponding to the state identifier in the future time. For example, consider again the example scenario in which a vehicle environment includes four cells $c_1$, $c_2$, $c_3$, and $c_4$, a first object is predicted to occupy $c_1$ and $c_2$ at a first future time $t_1$ and $c_2$ and $c_3$ at a second future time $t_2$, a second object is predicted to occupy $c_2$ at $t_1$ and $c_3$ at the $t_2$, the first object is predicted to have the state $s_1$ at $t_1$ and the state $s_2$ at $t_2$, and the second object is predicted to have the state $s_3$ at $t_1$ and the state $s_1$ at $t_2$. In this example scenario, the state identifier array may include the following elements: a first element ($t_1$, $c_1$, $s_1$) representing that $c_1$ is predicted to be occupied by an object having the state $s_1$ at $t_1$, a second element ($t_1$, $c_2$, $s_1$) representing that $c_2$ is predicted to be occupied by at least one object having the state $s_1$ at $t_1$, a third element ($t_1$, $c_2$, $s_3$) representing that $c_2$ is predicted to be occupied by at least one object having the state $s_3$ at $t_1$, a fourth element ($t_2$, $c_2$, $s_2$) representing that $c_2$ is predicted to be occupied by at least one object having the state $s_2$ at $t_2$, a fifth element ($t_2$, $c_3$, $s_2$) representing that $c_3$ is predicted to be occupied by at least one object having the state $s_2$ at $t_2$, and a sixth element ($t_2$, $c_3$, $s_1$) representing that $c_3$ is predicted to be occupied by at least one object having the state $s_1$ at $t_2$. In some cases, each element of the state identifier array corresponds to a state-occupancy record determined based on the prediction data. In some cases, the state identifier array is ordered based on an ordering of future time identifiers and/or an ordering of cell identifiers. For example, in some cases, the state identifier array is ordered based first on future time identifiers and then on future time identifiers.

In some cases, each element of the cell array is associated with one or more elements of the state identifier array and has a pointer to one of the (e.g., the first one) of those associated elements in the state identifier array. For example, if a cell array element ($t_1$, $c_1$) is associated with a single state identifier array element ($t_1$, $c_1$, $s_1$), then the second processing unit may store a pointer from the cell array element to the state identifier array element. As another example, if a cell array element ($t_1$, $c_2$) is associated with a first state identifier array element ($t_1$, $c_2$, $s_1$) and a second state identifier array element ($t_1$, $c_2$, $s_3$), then the second processing unit may store a pointer from the cell array element to the first state identifier array element.

In some cases, each element in the state data array includes state data associated with a defined state. Accordingly, in some cases, the number of elements in the state data array is equal to the number of defined states. In some cases, each element in the state identifier array has a pointer to an associated state data array element. For example, the state identifier array element ($t_1$, $c_2$, $s_1$) may have a pointer to a state data array that includes state data associated with $s_1$. In some cases, state data associated with a particular state include one or more features associated with movement and/or behavior of an object that is predicted to have the particular state. Examples of such features include speed, direction of movement, acceleration, lane change likelihood, braking likelihood, and/or the like.

In some cases, a data structure stores, for each state identifier, the number of cells (e.g., time-position pairings) that are predicted to occupy objects associated with the state identifier. In some cases, each object is associated with one state identifier. In some cases, a cell may be associated with no state identifiers, one state identifier, or two or more state identifiers. For example, if a cell is predicted to not occupy any objects, the cell may be associated with no state identifiers. As another example, if a cell is predicted to occupy one object, the cell may be associated with state identifier (e.g., the state identifier of the single object). As an additional example, if a cell is predicted to occupy more than one object, the cell may be associated with two or more state identifier (e.g., a state identifier associated with each object).

In some cases, the techniques described herein include querying the one or more linear arrays to determine state data associated with a proposed vehicle trajectory. In some cases, determining state data associated with a proposed trajectory includes determining a potential intersection region of the vehicle environment that is associated with the proposed trajectory in a future time and retrieving state data associated with an object that is predicted to be within the potential intersection region at the future time by querying the linear arrays.

In some cases, after receiving a proposed trajectory for evaluation, the second processing unit first determines potential intersection regions associated with one or more defined future times (e.g., one or more defined future times that align with defined future times at which predicted the first processing unit samples trajectories). In some cases, the second processing unit determines a potential intersection region for each future time. For example, to determine the potential intersection region for a future time, the second processing unit May determine a proposed waypoint for the future time and then determine a potential intersection region (e.g., a disk having a predefined radius) around the proposed waypoint. The proposed waypoint for a future time may represent a predicted location of the vehicle at the future time environment if the vehicle follows the proposed trajectory. Accordingly, in some cases, to determine the potential intersection regions for a proposed trajectory, the second processing unit: (i) identifies one or more defined future times at which the proposed trajectory is evaluated, and (ii) for each future time: (a) determines a proposed waypoint as a predicted location of the vehicle at the future time if the vehicle follows the proposed trajectory, (ii) determines a defined-shape region (e.g., a region corresponding to a disk having a predefined radius) around the proposed waypoint, and (iii) determines the potential intersection region for the future time period based on the defined-shape region. In some cases, to determine the potential intersection region for a future time period, the second processing unit selects a region surrounding the proposed waypoint of the future time period as determined based on one or more predicted movement features of the vehicle (e.g., a speed of the vehicle, an acceleration of the vehicle, a direction of the vehicle's movement, and/or the like) in the future time period under the proposed trajectory.

In some cases, after determining T potential intersection regions for the proposed trajectory each associated with one of T future time periods at which the trajectory is evaluated, the second processing unit queries the linear array(s) based on the T potential intersection regions. In some cases, if a particular cell in the vehicle environment falls within the potential intersection region for a particular future time, then the second processing unit queries the linear array (e.g., a cell array) to determine whether the linear array includes an array element that corresponds to the combination of the particular cell and the particular future time. For example, if a cell $c_b$ falls within a potential intersection region around the proposed waypoint of a time $t_a$, the second processing unit may query the cell array to determine if the cell array includes an element corresponding to $(t_a, c_b)$.

In some cases, after querying the linear array to determine whether the array includes an element corresponding to the combination of a particular cell and a particular future time, the second processing unit determines whether the linear array includes an element corresponding to the cell-time combination. In some cases, based on (e.g., in response to) determining that the linear array does not include such an element, the second processing unit may ignore the particular cell for the purpose of evaluating the proposed trajectory at the particular future time. For example, if a cell array does not include an element corresponding to $(t_a, c_b)$, then the second processing unit may ignore the cell $c_b$ for the purpose of evaluating the proposed trajectory at time $t_a$.

In some cases, if querying the linear array shows that the linear array includes an element corresponding to the combination of a particular cell and a particular future time, the second processing unit, then the second processing unit uses the element to retrieve the state data associated with the cell-time combination. In some cases, to retrieve the state data associated with a cell-time combination, the second processing unit uses a pointer from a cell array element corresponding to the cell-time combination to retrieve one or more state identifiers associated with the cell array element. In some cases, the second processing unit further uses one or more pointers from one or more state identifier array elements corresponding to the one or more state identifiers to the state data array to determine one or more state data array elements. In some cases, the second processing unit further retrieves state data represented by the one or more state data array elements.

For example, if a cell array includes an element corresponding to $(t_a, c_c)$, then the second processing unit may use the pointer of that element to the state identifier array to determine that the element is associated with the following elements in the state identifier array: (i) $(t_a, c_c, s_d)$, and (ii) $(t_a, c_c, s_e)$. In this example, based on the two elements in the state identifier array, the second processing unit may determine that state data associated with the state identifiers $s_d$ and $s_e$ is relevant to evaluating the proposed trajectory at time $t_a$. In some cases, the second processing unit may then use a pointer from an element of the state identifier array corresponding to $s_d$ to the state data array to identify an element of the state data array that corresponds to $s_d$ and subsequently retrieve state data associated with that identified element. Similarly, the second processing unit may then use a pointer from an element of the state identifier array that corresponds to $s_e$ to the state data array to identify an element of the state data array corresponding to $s_e$ and subsequently retrieve state data associated with that identified element.

In some cases, given a proposed trajectory that is associated with T defined future times at which the proposed trajectory is evaluated, the second processing unit determines T corresponding proposed waypoints, T corresponding potential intersection regions, T sets of queries of the linear array, and T sets of retrieved state data sets. In some cases, the state data for the proposed trajectory is determined based on at least one of the T sets of retrieved state data sets. In some cases, the state data for the proposed trajectory is determined by combining all of the T sets of retrieved state data.

In some cases, given a proposed trajectory that is associated with T defined future times at which the proposed trajectory is evaluated, the second processing unit uses T parallel processes each associated with a corresponding future time period. In some of such cases, each of the T parallel processes: (i) determines a proposed waypoint for the proposed trajectory at the corresponding future time period, (ii) determines a potential intersection region based on the proposed waypoint (e.g., based on a disk with a predefined radius that is centered around the proposed waypoint), (iii) detects each cell in the potential intersection region that is associated with an element in the linear array, (iv) retrieves state data associated with the detected cells, and (v) stores the retrieved state data in a query output array (e.g., a query output array that is shared among the T processes such as that all of the T processes can write to the query output array).

In some cases, state data for the proposed trajectory is determined based on the query output array(s) generated by the T processes associated with the T potential intersection regions. In some cases, the state data for the proposed trajectory is stored in an output array that has an element corresponding to each of S defined states. In some of such states, if a state identifier is retrieved by querying the linear arrays in accordance with the potential intersection regions associated with a proposed trajectory, the element corresponding to that output array is set to one. In some cases, the T processes can write to the output array without conflict or deadlock as the values of the output array are Boolean values. In some cases, the query response resulting from querying the linear arrays includes a state identifier array representing the state identifier of the object. In some cases, the state identifier array includes a Boolean array having a first cell corresponding to the state identifier, and the first cell has an affirmative Boolean value.

In some cases, the techniques described herein include evaluating a proposed trajectory based on the state data retrieved by querying the linear array in accordance with a proposed trajectory. In some cases, the second processing unit determines a trajectory score for the proposed trajectory based on: (i) whether the vehicle is likely to collide with an object, if the vehicle follows the trajectory, during T future times at which the trajectory is evaluated, and/or (ii) whether the vehicle is likely to collide with an object, if the vehicle follows the trajectory, after the T future times at which the trajectory is evaluated. In some cases, the second processing unit determines whether the vehicle is likely to collide with an object during the T future time periods based on distances between: (i) proposed waypoints of the vehicle during the T future time periods if the vehicle follows the proposed trajectory, and (ii) predicted object locations of objects in the vehicle environment during the T future time periods as determined based on occupancy predictions represented by state data associated with the proposed trajectory. In some cases, the second processing unit determines whether the vehicle is likely to collide with an object after the T future time periods based on distances between: (i) proposed waypoints of the vehicle after the T future time periods if the vehicle follows the proposed trajectory, and (ii) predicted object locations of objects in the vehicle environment during the T future time periods as determined based on movement/behavior predictions represented by state data associated with the proposed trajectory.

In at least some examples, the techniques described herein may be used to evaluate exploration of a trajectory, as in a tree search. For instance, the responses from querying the linear array at the second processing unit may be used in exploration of a tree which is subsequently used to determine a final trajectory. In such cases, the techniques described herein are used to generate the trajectory used to control the vehicle. Exemplary techniques for trajectory generation and/or evaluation using tree search operations are described in greater detail in U.S. Pat. No. 11,360,477, entitled "Trajectory Generation using Temporal Logic and Tree Search," which is incorporated by reference herein in its entirety and for all purposes.

In some cases, the techniques described herein include controlling the vehicle based on the output of evaluating the proposed trajectory. In some cases, given a set of proposed vehicle trajectories, the second processing unit determines a trajectory score for each one of those proposed trajectories. In some of such cases, the second processing unit selects an optimal trajectory based on the determined trajectory scores. For example, in some cases, the second processing unit selects the proposed trajectory having the highest trajectory score as the optimal trajectory. In some cases, subsequent to selecting the optimal trajectory, a system controller component controls the vehicle based on that optimal trajectory. In some cases, given a set of proposed vehicle trajectories, the second processing unit determined a trajectory score for each one of those proposed trajectories. In some of such cases, the second processing unit selects an optimal trajectory and an alternative trajectory based on the determined trajectory scores. For example, in some cases, the second processing unit selects the proposed trajectory having the highest trajectory score and the proposed trajectory having the second-highest trajectory score as the optimal trajectory and the alternative trajectory respectively. In some cases, subsequent to selecting the optimal trajectory and the alterative trajectory, a system controller component controls the vehicle based on at least one of those two trajectories.

In some cases, the techniques discussed herein can be implemented to facilitate and/or enhance safety of automated navigation features in vehicles, such as in automated vehicles or semi-automated vehicles. For example, the techniques can be used to determine a trajectory for an autonomous vehicle and control the autonomous vehicle based on the trajectory. As another example, the techniques can be used to determine that a current trajectory of a vehicle is likely to collide with an object that is within the environment of the vehicle. Upon determining that the current trajectory is likely to collide with an object, the driver of the vehicle may be stopped from following the current trajectory and/or the driver of the vehicle may be alerted about the likelihood of collision. In some cases, upon determining that the current trajectory of an autonomous vehicle is likely to collide with an object in the autonomous vehicle environment, the driver of the autonomous vehicle may be alerted to exercise manual control of the autonomous vehicle.

In some cases, the techniques described herein can be implemented to enable storage-efficient and fast evaluation of proposed trajectories. As described above, in some cases, the techniques described herein can enable using a GPU for faster evaluation of proposed vehicle trajectories, while accommodating the GPU's limited storage capacity by reducing the size of prediction data provided to the GPU relative to the size of predicted trajectories for environment objects. For example, in some cases, the objective behind sampling predicted trajectories and determining the prediction data based on objects in the ROI is to reduce the size of the prediction data relative to the size of the predicted trajectories. Reducing the size of prediction data may be important to facilitate storage of the prediction data on the GPU, as the GPU may have less storage capacity than the CPU, such that storing all of the predicted trajectories for all objects in the vehicle environment on the GPU may be unfeasible, impractical, and/or undesirable. Accordingly, the techniques described herein can be implemented to enable storage-efficient and fast evaluation of proposed trajectories.

In some cases, the techniques described herein reduce storage requirements of a trajectory evaluation system by storing a reduced representation of predicted trajectory data, rather than the raw predicted trajectories. As described above, in some cases, the second processing unit has less storage capacity than the first processing unit, such that it may be preferable to store a reduced representation of predicted trajectories on the second processing unit.

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using computer vision techniques, and are not limited to vehicles. Moreover, although various operations are described as being performed by a planning component of a vehicle computing device, a person of ordinary skill in the relevant technology will recognize that the planning component may be deployed on other computing devices, such as on a remote computing device that communicates with a vehicle computing device using a networked connection.

FIG. 1 is a flowchart diagram of an example process 100 for controlling a vehicle bay querying state data associated with an object in the vehicle environment. As depicted in FIG. 1, at operation 102, the process 100 includes receiving a proposed trajectory for a vehicle in a vehicle environment. The proposed trajectory may describe a sequence of actions for the vehicle to perform over a future time horizon.

An operational example of a vehicle environment 116 including a vehicle 104 and three objects (here three vehicles) A-C 106A-C is depicted in FIG. 1. As depicted in FIG. 1, the vehicle 104 is associated with a proposed trajectory 108 that, if followed by the vehicle 104, causes the vehicle 104 to move from its current location to the location $p_n$ at the future time $t_m$. In addition, each of the three objects A-C 106A-C is associated with a respective predicted trajectory. In particular, the predicted trajectories of the objects A-C 106A-C indicate that, by the future time $t_m$, objects A-B 106A-B are predicted to reach the point $p_n$ and object C 106C is predicted to reach point $p_k$. Although the example implementation depicted in FIG. 1 includes one predicted trajectory for each object, a person of ordinary skill in the relevant technology will recognize that a prediction component may generate two or more predicted trajectories for an object.

At operation 112, the process 100 includes determining an ROI for the vehicle. As depicted in FIG. 1, the ROI 114 is determined that includes objects A-B 106A-B but not object C 106C, as object C 106C is located outside of the ROI 114.

In some cases, the ROI 114 represents the boundaries of a region within the vehicle environment that is determined to be of relatively higher importance for the vehicle's trajectory planning purposes, such that an object that falls outside of the ROI 114 may be determined to be of relatively less significance for the vehicle's trajectory planning purposes. In some cases, to determine the prediction data to send to the second processing unit, the first processing unit ignores predicted trajectories of objects that fall outside of the ROI 114 at the current time.

As depicted in FIG. 1, in some cases, the ROI 114 is a region that includes the vehicle's current position and a surrounding region. In some cases, the surrounding region is a fixed region around the vehicle's current position, such as a rectangular-shaped region having a fixed set of dimensions that is centered around the vehicle's current position. In some cases, the surrounding region is determined based on an estimated vehicle occupancy in the future. For example, the surrounding region may be determined based on one or more candidate actions that are available to the vehicle at the current time. In some cases, the ROI 114 is a region (e.g., a region having a particular shape, such as a rectangular shape) that covers the current vehicle position as well as all of the candidate actions available to the vehicle at the current time with some additional buffer.

At operation 122, the process 100 includes determining state data associated with the proposed trajectory. In some cases, determining state data associated with a proposed trajectory includes determining a potential intersection region of the vehicle environment that is associated with the proposed trajectory in a future time and retrieving state data associated with an object that is predicted to be within the potential intersection region at the future time by querying one or more linear arrays. Querying one or more linear arrays to retrieve state data associated with a proposed trajectory is described in greater detail below with reference to FIG. 4.

In some cases, the state data is retrieved by querying one or more linear arrays, where the linear arrays represent state data associated with predicted trajectories of the objects in the ROI. For example, as depicted in FIG. 1, the set of linear arrays 124 represent occupancy and state data corresponding to objects A-B 106A-B but not occupancy and state data corresponding to object C 106C, as object C 106C is outside of the determined ROI 114. In particular, as depicted in FIG. 1, the set of linear arrays 124 includes a first linear array 126 that includes an element corresponding to the combination of $t_m$ and $p_n$, because predicted trajectories for objects 106A-B (that are within the ROI 114) indicate that those two objects will be at point $p_n$ by the time $t_m$. However, while the predicted trajectory for object C 106C indicates that object C 106C is predicted to be at point $p_k$ by the time $t_m$, the first linear array 126 does not include an element corresponding to the combination of $t_m$ and $p_k$, because object C 106C is outside of the ROI 114.

The first linear array 126 may be a cell array. In some cases, each array element in the cell array represents a combination of a cell in the vehicle environment and a future time, where the prediction data represents that at least one object is predicted to occupy the cell at the future time. In some cases, the cell array is ordered based on an ordering of future time identifiers and/or an ordering of cell identifiers. For example, in some cases, the cell array is ordered based first on future time identifiers and then on future time identifiers.

As further depicted in FIG. 1, the set of linear arrays 124 include a second linear array 128 that includes a first element corresponding to the combination of $t_m$, $p_n$, $s_1$ and a second element corresponding to the combination of $t_m$, $p_n$, $s_2$. The first element may represent that the object A 106A is predicted to be $p_n$ and have the state $s_1$ by the time $t_m$, while the second element may represent that the object B 106B is predicted to be $p_n$ and have the state $s_2$ by the time $t_m$. Both of those elements are associated with the element of the first linear array 126 that corresponds to the time $t_m$ and the point $p_n$, and thus the described element of the first linear array 126 has a pointer to the first one of the two elements in the second linear array 128, namely to the element of the second linear array 128 that corresponds to the time $t_m$, the point $p_n$, and the state $s_1$.

The second linear array 126 may be a state identifier array. In some cases, each element in the state identifier array represents a combination of a cell in the vehicle environment, a future time, and a state identifier, where the prediction data represents that at least one of the objects that are predicted to occupy the cell in the future time is predicted to have the object state corresponding to the state identifier in the future time. In some cases, each element of the state identifier array corresponds to a state-occupancy record determined based on the prediction data. In some cases, the state identifier array is ordered based on an ordering of future time identifiers and/or an ordering of cell identifiers. For example, in some cases, the state identifier array is ordered based first on future time identifiers and then on future time identifiers.

As further depicted in FIG. 1, the set of linear arrays 124 includes a third linear array 134 that includes state data associated with various defined states. In some cases, each element of the second linear array 126 indicates a state identifier and is thus associated with a state represented by an element of the third linear array 134. In some cases, each element of the second linear array 126 has a pointer to a corresponding element of the third linear array 134.

The third linear array 134 may be a state data array. In some cases, each element in the state data array includes state data associated with a defined state. Accordingly, in some cases, the number of elements in the state data array is equal to the number of defined states. In some cases, each element in the state identifier array has a pointer to an associated state data array element. For example, the state identifier array element ($t_1$, $c_2$, $s_1$) may have a pointer to a state data array that includes state data associated with $s_1$. In some cases, state data associated with a particular state include one or more features associated with movement and/or behavior of an object that is predicted to have the particular state. Examples of such features include speed, direction of movement, acceleration, lane change likelihood, braking likelihood, and/or the like.

While the exemplary implementation depicted in FIG. 1 uses a set of linear arrays 124 including three linear arrays, a person of ordinary skill in the relevant technology will recognize that any number of linear arrays may be used. Exemplary techniques for determining linear arrays are described in greater detail below with reference to FIGS. 2 and 5.

At operation 132, the process 100 includes controlling the vehicle based on the state data. In some cases, a processing unit determines a trajectory store for the proposed trajectory based on the state data, determines whether to validate the proposed trajectory based on the trajectory score, and controls the vehicle based on the trajectory validation determination.

In some cases, the processing unit determines a trajectory score for the proposed trajectory based on: (i) whether the vehicle is likely to collide with an object during T future times at which the trajectory is evaluated if the vehicle follows the trajectory, and/or (ii) whether the vehicle is likely to collide with an object after the T future times at which the trajectory is evaluated if the vehicle follows the trajectory. In some cases, the processing unit determines whether the vehicle is likely to collide with an object during the T future time periods based on distances between: (i)

proposed waypoints of the vehicle during the T future time periods if the vehicle follows the proposed trajectory, and (ii) predicted object locations of objects in the vehicle environment during the T future time periods as determined based on occupancy predictions represented by state data associated with the proposed trajectory. In some cases, the processing unit determines whether the vehicle is likely to collide with an object after the T future time periods based on distances between: (i) proposed waypoints of the vehicle after the T future time periods if the vehicle follows the proposed trajectory, and (ii) predicted object locations of objects in the vehicle environment during the T future time periods as determined based on movement/behavior predictions represented by state data associated with the proposed trajectory.

In some cases, the processing unit determines whether to validate the proposed trajectory based on the trajectory score for the proposed trajectory. In some cases, the processing unit determines to validate the proposed trajectory if the trajectory score exceeds a threshold. In some cases, the processing unit determines to validate the proposed trajectory if the trajectory score is the largest trajectory score among trajectory scores for a set of proposed trajectories. In some cases, the processing unit determines to validate the proposed trajectory if the trajectory score is one of N largest trajectory scores among trajectory scores for a set of proposed trajectories.

In some cases, a system controller component controls the vehicle based on the trajectory validation determination based on the trajectory validation determination for the proposed trajectory. In some cases, based on (e.g., in response to) determining that the proposed trajectory is validated, the system controller component controls the vehicle based on the proposed trajectories. In some cases, given a set of proposed vehicle trajectories, the second processing unit determines a trajectory score for each one of those proposed trajectories. In some of such cases, the second processing unit selects an optimal trajectory based on the determined trajectory scores. For example, in some cases, the second processing unit selects the proposed trajectory having the highest trajectory score as the optimal trajectory. In some cases, subsequent to selecting the optimal trajectory, a system controller component controls the vehicle based on that optimal trajectory. In some cases, given a set of proposed vehicle trajectories, the second processing unit determined a trajectory score for each one of those proposed trajectories. In some of such cases, the second processing unit selects an optimal trajectory and an alternative trajectory based on the determined trajectory scores. For example, in some cases, the second processing unit selects the proposed trajectory having the highest trajectory score and the proposed trajectory having the second-highest trajectory score as the optimal trajectory and the alternative trajectory respectively. In some cases, subsequent to selecting the optimal trajectory and the alterative trajectory, a system controller component controls the vehicle based on at least one of those two trajectories.

In some cases, given a set of proposed vehicle trajectories, the second processing unit determines a trajectory score for each one of those proposed trajectories. In some cases, the trajectory scores are used to determine an optimal trajectory. For example, in some cases, the trajectory scores are used to determine a potential trajectory for subsequent optimization. In some cases, after the potential trajectory is optimized, the optimized potential trajectory is used to control the vehicle.

Figure 2:
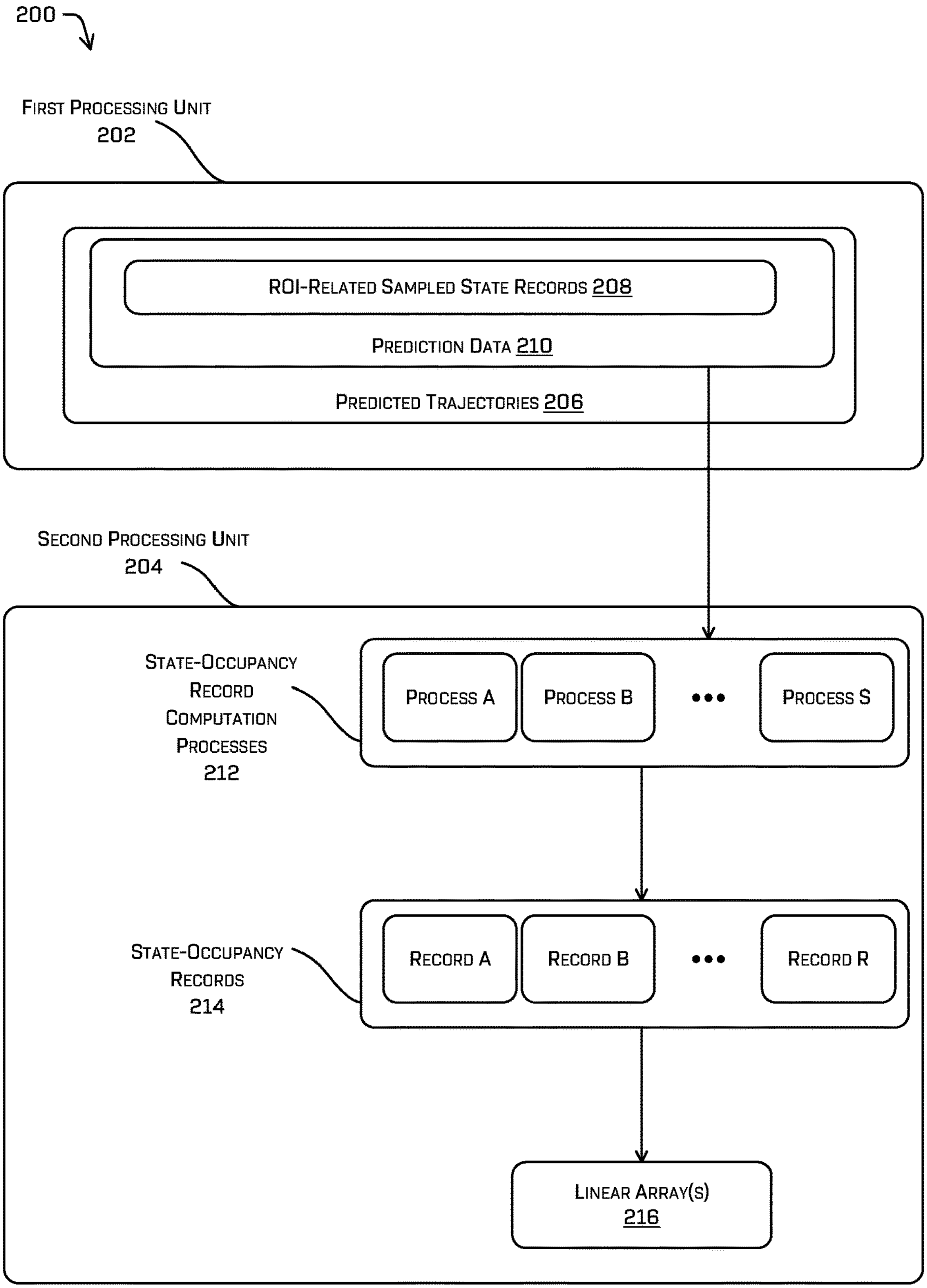
FIG. 2 is a data flow diagram of an example process for determining one or more linear arrays.

FIG. 2 is a data flow diagram of an example process 200 for determining one or more linear arrays 216. As depicted in FIG. 2, the process 200 starts when a first processing unit 202 (e.g., a CPU) determines prediction data 210 based on predicted trajectories 206 for a set of objects in the vehicle environment. As depicted in FIG. 2, the prediction data 210 includes data ROI-related sampled trajectories 208 generated by sampling the predicted trajectories 206 for objects that are within an ROI of the vehicle.

In some cases, to determine prediction data 210 for transmission to the second processing unit, the first processing unit 202 samples from predicted trajectories 206 for one or more objects in the ROI. In some cases, the objective behind sampling predicted trajectories 206 and determining the prediction data 210 based on objects in the ROI is to reduce the size of the prediction data 210 relative to the size of the predicted trajectories 206. Reducing the size of prediction data 210 may be important to facilitate storage of the prediction data on the second processing unit 204, as the second processing unit 204 may have less storage capacity than the first processing unit 202, such that storing all of the predicted trajectories for all objects in the vehicle environment on the second processing unit 204 may be unfeasible, impractical, and/or undesirable.

Accordingly, the first processing unit 202 may perform one or more operations to reduce the size of the prediction data 210 sent to the second processing unit 204. For example, the first processing unit 202 may sample from predicted trajectories 206 and determine the prediction data 210 based on sampled predicted trajectories 206. As another example, the first processing unit 202 may determine the prediction data 210 based on predicted trajectories 206 for objects whose current locations fall within the determined ROI. As a further example, the first processing unit 202 may determine the prediction data 210 by sampling from predicted trajectories 206 for objects whose current locations fall within the determined ROI.

In some cases, to sample from a predicted trajectory 206 of an object within the ROI, the first processing unit 202 selects predicted states of the predicted trajectory 206 that are associated with pre-defined future times. For example, the first processing unit 202 may select a predicted state from the predicted trajectory 206 every 0.10 seconds. In some cases, the predefined future times at which predicted trajectories 206 are sampled align with times at which proposed trajectories are evaluated by the second processing unit 204.

In some cases, the output of sampling from the predicted trajectories 206 of S objects in the vehicle environment across T timesteps is a two-dimensional matrix with the dimensions S×T or T×S. In some cases, to determine the prediction data 210 sent to the second processing unit 204, the first processing unit 202 flattens the two-dimensional matrix into a one-dimensional array, such as a one-dimensional array having O*T values. In some cases, a value of the one-dimensional array may represent that an object is predicted to be at a particular location and/or have a particular state at a particular future time.

As further depicted in FIG. 2, the process 200 continues when the first processing unit 202 the prediction data 210 to the second processing unit 204. In some cases, the prediction data 210 sent to the second processing unit 204 represent one or more predicted object states for one or more objects in the vehicle environment (e.g., for one or more objects that are within the ROI of the vehicle environment). In some cases, the prediction data 210 sent to the second processing unit 204 also represent one or more predicted locations for one or more objects in the vehicle environment (e.g., for one or more objects that are within the ROI of the vehicle environment). For example, the prediction data 210 may represent that a first object (e.g., a first object in the ROI of the vehicle environment) is configured to be at a location $(x_1, y_1)$ and have the state $s_1$ at a first future time step, be at a location $(x_2, y_2)$ and have the state $s_2$ at a second future time step, and in general be at a location $(x_i, y_i)$ and have the state $s_i$ at an ith future time step. Accordingly, in some cases, the prediction data 210 may represent one or more occupancy values and one or more state values. An occupancy value may represent that an object is predicted to occupy a particular cell in the vehicle environment at a particular future timestep. A state value may represent that an object is predicted to have a particular state at a particular future timestep.

In some cases, the prediction data includes a set of two-dimensional grids each associated with a time. In some cases, each two-dimensional grid is associated with one or more cells each associated with a position in the vehicle environment. In some cases, a cell of a two-dimensional grid may be associated with an object if the object is predicted to occupy the corresponding position at the corresponding time. In some cases, if two or more objects are predicted to occupy a given position at a given time, then the corresponding cell is associated with the two or more objects. In some cases, a cell may be associated with the state identifiers of any objects that are predicted to occupy the corresponding position at the corresponding time.

In some cases, determining a two-dimensional grid includes determining an occupancy value for a cell of the two-dimensional grid based at least in part on a set of predicted trajectories for a set of objects and the size of each object that is predicted to occupy the cell. For example, if an object is predicted to occupy two cells based on the predicted trajectory of the object, then the two-dimensional grid associates the two cells with an occupancy value representing that each of those two cells occupies a portion of the object. Accordingly, a bigger object may be associated with more two-dimensional grid cells relative to a smaller object.

As further depicted in FIG. 2, the process 200 continues when the second processing unit executes S state-occupancy computation processes 212 in parallel to determine R state-occupancy records 214. In some cases (e.g., when there is a discrete number of defined states), to determine the state-occupancy records 214 based on the prediction data 210 received from the first processing unit 202, the second processing unit 204 allocates one parallel process to each defined state that may be assigned to an object in a future timestep by the prediction data. In some of those cases, given S defined states, S state-occupancy computation processes 212 are initialized, where each state-occupancy computation process 212 processes the prediction data 210 to determine state-occupancy records for a respective one of the defined states. A state-occupancy record 214 may represent that an object having a respective state may occupy a respective cell of the vehicle environment at a respective future time.

For example, consider an example scenario in which a vehicle environment includes four cells $c_1$, $c_2$, $c_3$, and $c_4$, a first object is predicted to occupy $c_1$ and $c_2$ at a first future time $t_1$ and $c_2$ and $c_3$ at a second future time $t_2$, a second object is predicted to occupy $c_2$ at $t_1$ and $c_3$ at the $t_2$, the first object is predicted to have the state $s_1$ at $t_1$ and the state $s_2$ at $t_2$, and the second object is predicted to have the state $s_3$ at $t_1$ and the state $s_1$ at $t_2$. In this example scenario, if there are four defined states $\{s_1, s_2, s_3, s_4\}$: (i) a first process may process the prediction data associated with the vehicle environment to determine the state-occupancy records $(t_1, c_1, s_1)$, $(t_1, c_2, s_1)$, $(t_1, c_2, s_1)$, and $(t_2, c_3, s_1)$ associated with the respective state $s_1$, (ii) a second process may process the prediction data associated with the vehicle environment to determine the state-occupancy records $(t_2, c_2, s_2)$ and $(t_2, c_3, s_2)$ associated with the respective state $s_3$, (iii) a third process may process the prediction data associated with the vehicle environment to determine the state-occupancy record $(t_1, c_2, s_3)$ associated with the respective state $s_3$, and (iv) a fourth process may process the prediction data associated with the vehicle environment to determine that the respective state $s_4$ is not represented by the prediction data and thus does not need to have a corresponding state-occupancy record.

In some cases, subsequent to determining the state-occupancy records 214, the second processing unit 204 orders the state-occupancy records 214. In some cases, the second processing unit 204 orders the state-occupancy records 214 based on at least one of future time identifiers, cell identifiers, or state identifiers. For example, in some cases, the second processing unit 204 orders the state-occupancy records 214 based first on time identifiers and second on cell identifiers. For example, in some cases, the second processing unit 204 orders the state-occupancy records 214 in a manner such that: (i) all state-occupancy records associated with a later time are placed after all state-occupancy records associated with an earlier time, (ii) all state-occupancy records associated with a common time are placed one after another (e.g., in a contiguous segment of the sequence), and (iii) an state-occupancy record that is associated with a smaller cell identifier (e.g., as determined based on a sequence of cells) is placed before a state-occupancy record that is associated with the same time but a larger cell identifier.

As further depicted in FIG. 2, the process 200 continues when the second processing unit 204 determines one or more linear arrays 216 based on the state-occupancy records 214. In some cases, the linear arrays 216 collectively describe the state-occupancy records 214. For example, in some cases, the linear arrays 216 include a cell array, a state identifier array, and a state data array. In some cases, each array element in the cell array represents a combination of a cell in the vehicle environment and a future time, where the prediction data represents that at least one object is predicted to occupy the cell at the future time. For example, if a vehicle environment includes four cells $c_1$, $c_2$, $c_3$, and $c_4$, a first object is predicted to occupy $c_1$ and $c_2$ at a first future time $t_1$ and $c_2$ and $c_3$ at a second future time $t_2$, and a second object is predicted to occupy $c_2$ at $t_1$ and $c_3$ at the $t_2$, the first object is predicted to have the state $s_1$ at $t_1$, then the cell array may include the following elements: a first element corresponding to the $(t_1, c_1)$ because an object is predicted to occupy $c_1$ at $t_1$, a second element corresponding to the $(t_1, c_2)$ because two objects are predicted to occupy $c_2$ at $t_1$, a third element corresponding to the $(t_2, c_2)$ because one object is predicted to occupy $c_2$ at $t_2$, and a fourth element corresponding to the $(t_2, c_3)$ because two objects are predicted to occupy $c_3$ at $t_2$.

In some cases, each element of the state identifier array corresponds to a state-occupancy record determined based on the prediction data. In some cases, the state identifier array is ordered based on an ordering of future time identifiers and/or an ordering of cell identifiers. For example, consider again the example scenario in which a vehicle environment includes four cells $c_1$, $c_2$, $c_3$, and $c_4$, a first object is predicted to occupy $c_1$ and $c_2$ at a first future time $t_1$ and $c_2$ and $c_3$ at a second future time $t_2$, a second object is predicted to occupy $c_2$ at $t_1$ and $c_3$ at the $t_2$, the first object is predicted to have the state $s_1$ at $t_1$ and the state $s_2$ at $t_2$, and the second object is predicted to have the state $s_3$ at $t_1$ and the state $s_1$ at $t_2$. In this example scenario, the state identifier array may include the following elements: a first element ($t_1$, $c_1$, $s_1$) representing that $c_1$ is predicted to be occupied by an object having the state $s_1$ at $t_1$, a second element ($t_1$, $c_2$, $s_1$) representing that $c_2$ is predicted to be occupied by at least one object having the state $s_1$ at $t_1$, a third element ($t_1$, $c_2$, $s_3$) representing that $c_2$ is predicted to be occupied by at least one object having the state $s_3$ at $t_1$, a fourth element ($t_2$, $c_2$, $s_2$) representing that $c_2$ is predicted to be occupied by at least one object having the state $s_2$ at $t_2$, a fifth element ($t_2$, $c_3$, $s_2$) representing that $c_3$ is predicted to be occupied by at least one object having the state $s_2$ at $t_2$, and a sixth element ($t_2$, $c_3$, $s_1$) representing that $c_3$ is predicted to be occupied by at least one object having the state $s_1$ at $t_2$.

In some cases, if a cell array element ($t_1$, $c_1$) is associated with a single state identifier array element ($t_1$, $c_1$, $s_1$), then the second processing unit may store a pointer from the cell array element to the state identifier array element. In some cases, if a cell array element ($t_1$, $c_2$) is associated with a first state identifier array element ($t_1$, $c_2$, $s_1$) and a second state identifier array element ($t_1$, $c_2$, $s_3$), then the second processing unit may store a pointer from the cell array element to the first state identifier array element.

Figure 3:
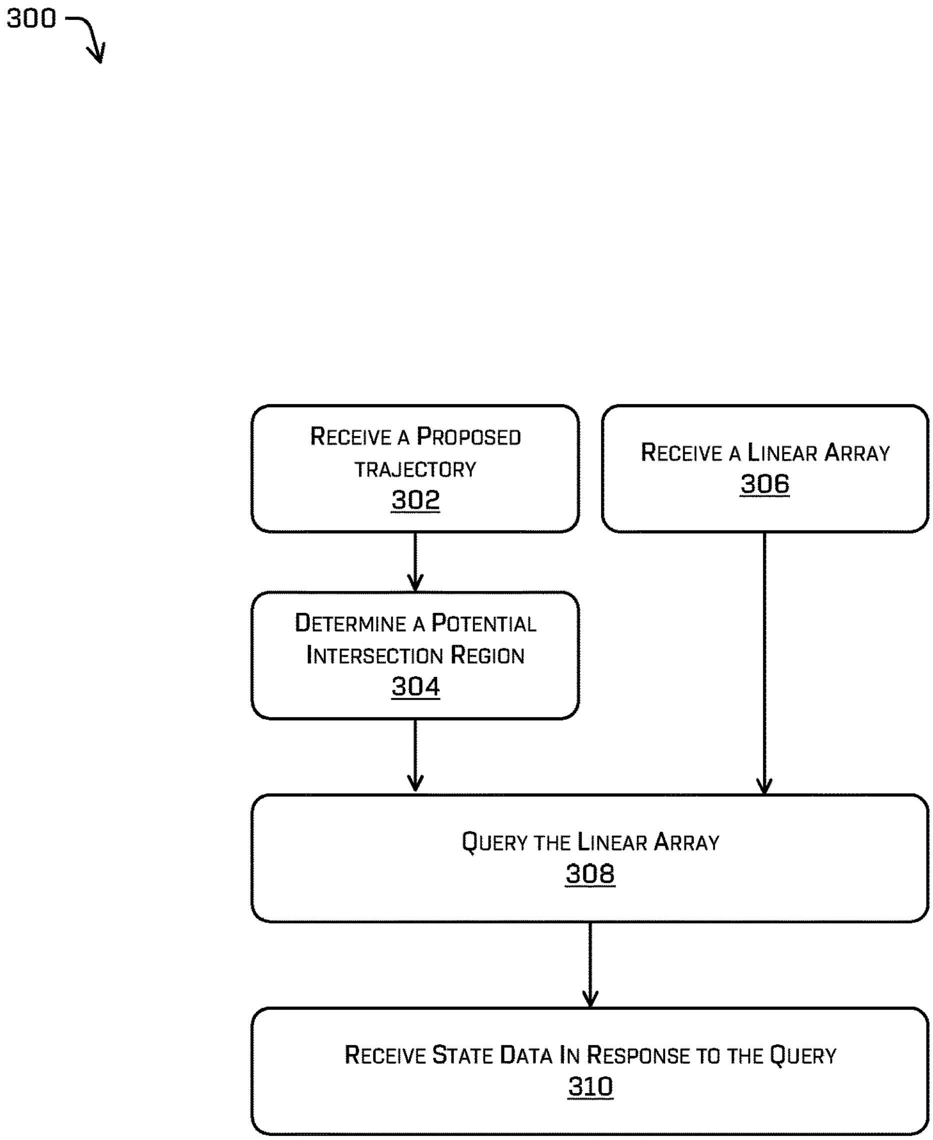
FIG. 3 is a flowchart diagram of an example process for retrieving state data associated with a proposed trajectory using a second processing unit.

FIG. 3 is a flowchart diagram of an example process 300 for retrieving state data associated with a proposed trajectory using a second processing unit. As depicted in FIG. 3, at operation 302, the second processing unit receives a proposed trajectory. The proposed trajectory may describe a sequence of actions for the vehicle to perform over a future time horizon.

At operation 304, the second processing unit determines a potential intersection region around a proposed waypoint associated with the proposed trajectory. In some cases, the second processing unit queries a linear array by determining a plurality of proposed waypoints associated with a proposed trajectory for the autonomous vehicle to follow, determining, for a proposed waypoint of the plurality of proposed waypoints, a potential intersection region around the proposed waypoint, and determining, based at least in part on the linear array, whether an object is within the radius at the time.

In some cases, a potential intersection region is determined around each of a plurality of proposed waypoints associated with the proposed trajectory. In some cases, the combination of the potential intersection regions across all the proposed waypoints is a three-dimensional shape, such as a tube, around the proposed trajectory.

In some cases, to determine one or more potential intersection regions for a proposed trajectory, the second processing unit: (i) identifies one or more defined future times at which the proposed trajectory is evaluated, and (ii) for each future time: (a) determines a proposed waypoint as a predicted location of the vehicle at the future time if the vehicle follows the proposed trajectory, (ii) determines a defined-shape region (e.g., a region corresponding to a disk having a predefined radius) around the proposed waypoint, and (iii) determines the potential intersection region for the future time period based on the defined-shape region. In some cases, to determine the potential intersection region for a future time period, the second processing unit selects a region surrounding the proposed waypoint of the future time period as determined based on one or more predicted movement features of the vehicle (e.g., a speed of the vehicle, an acceleration of the vehicle, a direction of the vehicle's movement, and/or the like) in the future time period under the proposed trajectory. Exemplary techniques for determining waypoints and potential intersection regions are described in greater detail below with reference to FIG. 4.

At operation 306, the second processing unit receives a linear array. In some cases, after receiving the prediction data from the first processing unit, the second processing unit determines one or more linear arrays based on the prediction data. The linear arrays may represent occupancy data and/or state data associated with a set of objects in the vehicle environment (e.g., a set of objects in the ROI). For example, the one or more linear arrays may represent, for each cell in a target region of the vehicle environment (e.g., in the ROI): (i) which of the set of objects (if any) are predicted to occupy the cell in one or more future times associated with the prediction data, and/or (ii) for each object that is predicted to occupy the cell in a respective future time, the predicted state of the object at the respective future time.

At operation 308, the second processing unit querying the linear array based on the potential intersection region. In some cases, after determining T potential intersection regions for the proposed trajectory each associated with one of T future time periods at which the trajectory is evaluated, the second processing unit queries the linear array(s) based on the T potential intersection regions. In some cases, if a particular cell in the vehicle environment falls within the potential intersection region for a particular future time, then the second processing unit queries the linear array (e.g., a cell array) to determine whether the linear array includes an array element that corresponds to the combination of the particular cell and the particular future time.

In some cases, after querying the linear array to determine whether the array includes an element corresponding to the combination of a particular cell and a particular future time, the second processing unit determines whether the linear array includes an element corresponding to the cell-time combination. In some cases, based on (e.g., in response to) determining that the linear array does not include such an element, the second processing unit may ignore the particular cell for the purpose of evaluating the proposed trajectory at the particular future time. In some cases, if querying the linear array shows that the linear array includes an element corresponding to the combination of a particular cell and a particular future time, the second processing unit, then the second processing unit uses the element to retrieve the state data associated with the cell-time combination.

At operation 310, the second processing unit retrieves state data associated with the proposed trajectory based on the query output. In some cases, to retrieve the state data associated with a cell-time combination, the second processing unit uses a pointer from a cell array element corresponding to the cell-time combination to retrieve one or more state identifiers associated with the cell array element, uses one or more pointers from one or more state identifier array elements corresponding to the one or more state identifiers to the state data array to determine one or more state data array elements, and retrieves state data represented by the one or more state data array elements. In some cases, state data includes data representing that a position is predicted to occupy an object having a particular state. In some cases, occupancy data includes data representing that a position is predicted to a particular object.

For example, if a cell array includes an element corresponding to ($t_a$, $c_c$), then the second processing unit may use the pointer of that element to the state identifier array to determine that the element is associated with the following elements in the state identifier array: (i) ($t_a$, $c_c$, $s_d$), and (ii)

($t_a$, $c_c$, $s_e$). In this example, based on the two elements in the state identifier array, the second processing unit may determine that state data associated with the state identifiers $s_d$ and $s_e$ is relevant to evaluating the proposed trajectory at time $t_a$. In some cases, the second processing unit may then use a pointer from an element of the state identifier array that corresponds to $s_d$ to the state data array to identify an element of the state data array that corresponds to $s_d$ and subsequently retrieve state data associated with that identified element. Similarly, the second processing unit may then use a pointer from an element of the state identifier array that corresponds to $s_e$ to the state data array to identify an element of the state data array that corresponds to $s_e$ and subsequently retrieve state data associated with that identified element. In some cases, state and/or occupancy data retrieved from the linear array is provided to the first processing unit (e.g., to the CPU). The first processing unit may use the retrieved state to optimize a potential trajectory. The optimized potential trajectory may be used to control the vehicle.

Figure 4:
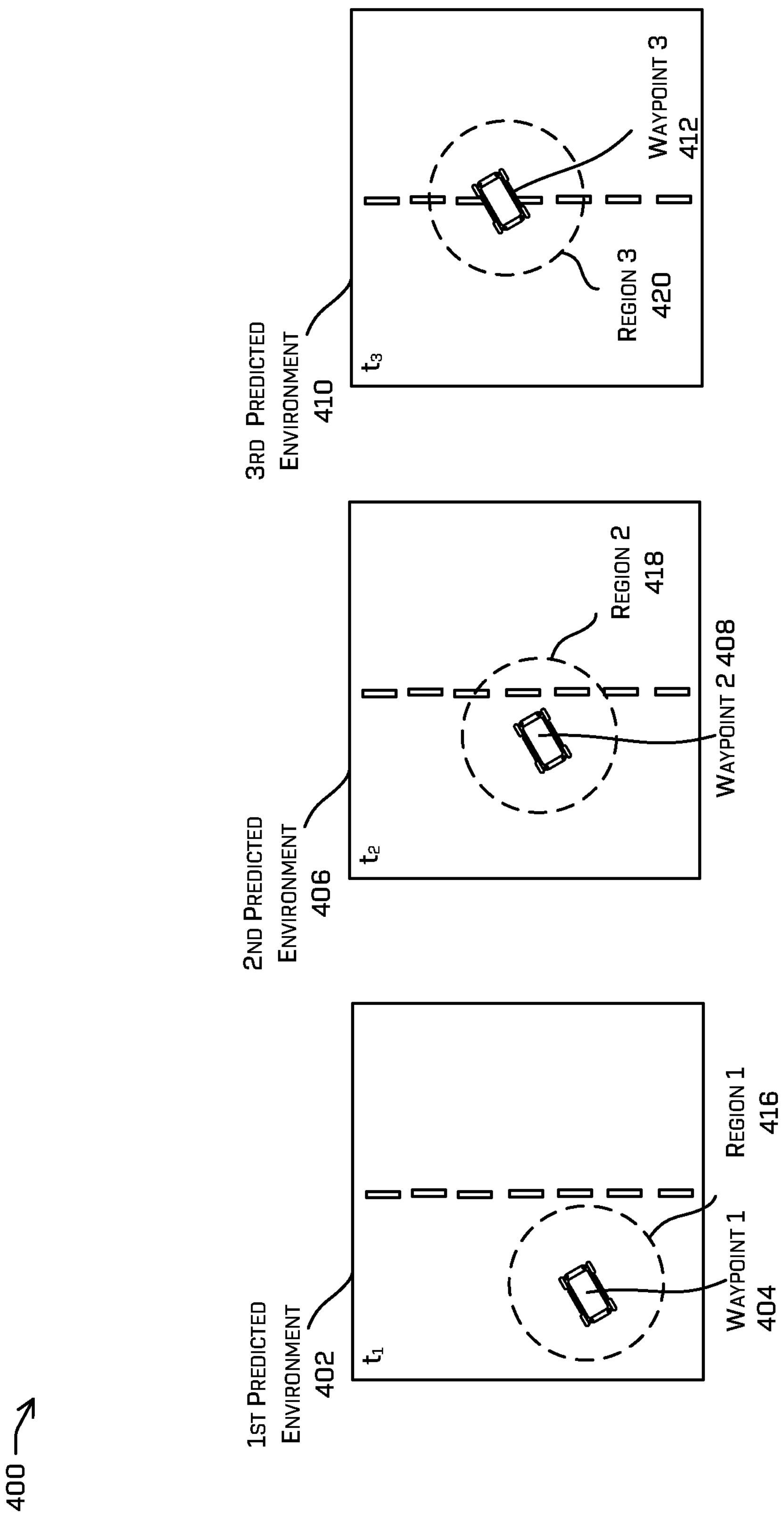
FIG. 4 is an operational example of determining three potential intersection regions for three future times.

FIG. 4 is an operational example 400 of three potential intersection regions 416, 418, and 420 determined for three future times $t_1$, $t_2$, and $t_3$ respectively. As depicted in FIG. 4, at future time $t_1$ that is associated with the predicted vehicle environment 402, the vehicle is predicted to be at the waypoint 404 if following a proposed trajectory. Accordingly, the potential intersection region 416 corresponding to the future time $t_1$ is a disk with a defined radius around the waypoint 404.

As further depicted in FIG. 4, at future time $t_2$ that is associated with the predicted vehicle environment 406, the vehicle is predicted to be at the waypoint 408 if following the proposed trajectory. Accordingly, the potential intersection region 418 corresponding to the future time $t_2$ is a disk with a defined radius around the waypoint 408.

As further depicted in FIG. 4, at future time $t_3$ that is associated with the predicted vehicle environment 410, the vehicle is predicted to be at the waypoint 412 if following the proposed trajectory. Accordingly, the potential intersection region 420 corresponding to the future time $t_3$ is a disk with a defined radius around the waypoint 412.

Figure 5:
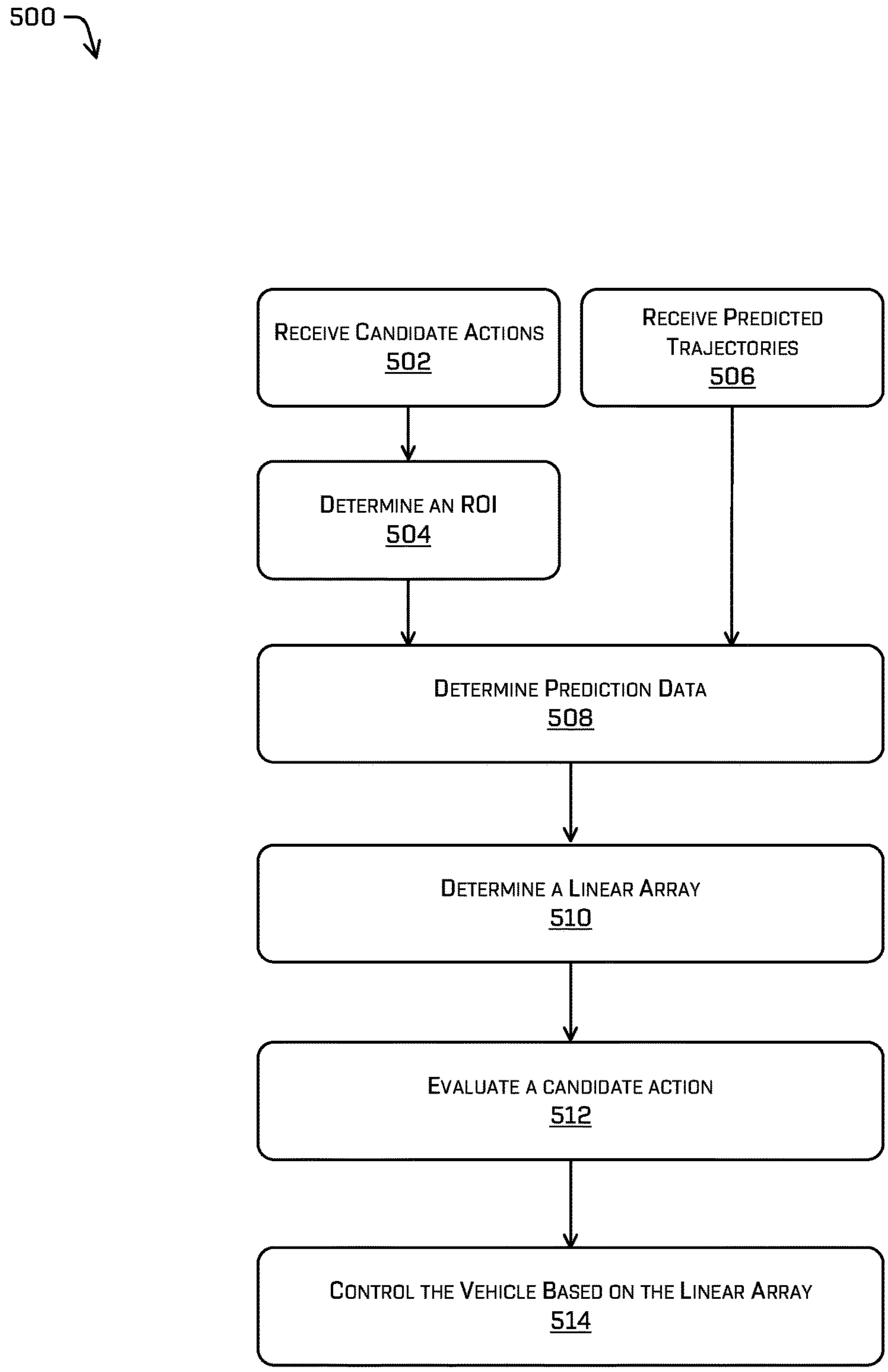
FIG. 5 is a flowchart diagram of an example process for controlling a vehicle based on a linear array.

FIG. 5 is a flowchart diagram of an example process 500 for controlling a vehicle based on a linear array. As depicted in FIG. 5, at operation 502, the process 500 includes receiving candidate actions associated with the vehicle. Each candidate action may be associated with an action reference that represents a trajectory of the vehicle if the vehicle performs the candidate action (e.g., turn left, turn right, merge left, merge right, slow down, speed up, stop, continue straight, etc.). In some cases, the candidate actions are received by the first processing unit. In various examples, such candidate actions may be associated with a node in a trajectory tree search.

At operation 504, the process 500 includes determining the ROI based on the candidate actions. In some cases, the ROI is a region that includes the vehicle's current position and a surrounding region. In some cases, the surrounding region is determined based on an estimated vehicle occupancy in the future. For example, the surrounding region may be determined based on one or more candidate actions that are available to the vehicle at the current time. In some cases, the ROI is a region (e.g., a region having a particular shape, such as a rectangular shape) that covers the current vehicle position as well as all of the candidate actions available to the vehicle at the current time with some additional buffer. In some cases, the ROI is a region (e.g., a region having a particular shape, such as a rectangular shape) that covers the current vehicle position as well as action references for all of the candidate actions available to the vehicle at the current time with some additional buffer. In some cases, the ROI is determined by the second processing unit.

At operation 506, the process 500 includes receiving predicted trajectories for one or more objects in the vehicle environment. In some cases, a predicted trajectory represents a sequence of actions and/or positions for a corresponding object. Examples of objects include vehicles, pedestrians, etc. In some cases, the predicted trajectories are received by the first processing unit.

At operation 508, the process 500 includes determining prediction data based on the ROI and the received predicted trajectories. In some cases, the first processing unit determines the prediction data by sampling from the predicted trajectories for objects in the vehicle environment that are located within the ROI. The output of the sampling may be one or more sampled states, where each sampled state may represent that a corresponding object is predicted to have a particular state at a corresponding future time. In some cases, the first processing unit determines prediction data and provides the prediction data to the second processing unit.

At operation 510, the process 500 determines a linear array based on the prediction data. In some cases, after receiving the prediction data from the first processing unit, the second processing unit determines one or more linear arrays based on the prediction data. The linear arrays may represent occupancy data and/or state data associated with a set of objects in the vehicle environment (e.g., a set of objects in the ROI). For example, the one or more linear arrays may represent, for each cell in a target region of the vehicle environment (e.g., in the ROI): (i) which of the set of objects (if any) are predicted to occupy the cell in one or more future times associated with the prediction data, and/or (ii) for each object that is predicted to occupy the cell in a respective future time, the predicted state of the object at the respective future time.

At operation 512, the process 500 evaluates at least one of the candidate actions received at operation 502 by querying the linear array. In some cases, each candidate action received at operation 502 is evaluated by querying the linear array. In some cases, to evaluate a candidate action, a cost is determined for the candidate action based on occupancy data generated by querying the linear array. In some cases, determining occupancy data associated with a proposed trajectory includes determining a zone of the vehicle environment that is associated with the proposed trajectory in a future time and retrieving state data associated with an object that is predicted to be within the zone at the future time by querying the linear arrays. In some cases, the second processing unit determines a trajectory score for the proposed trajectory based on: (i) whether the vehicle is likely to collide with an object during T future times at which the trajectory is evaluated if the vehicle follows the trajectory, and/or (ii) whether the vehicle is likely to collide with an object after the T future times at which the trajectory is evaluated if the vehicle follows the trajectory. In some cases, given a set of proposed vehicle trajectories, the second processing unit determined a trajectory score for each one of those proposed trajectories. In some of such cases, the second processing unit selects an optimal trajectory based on the determined trajectory scores. For example, in some cases, the second processing unit selects the proposed trajectory having the highest trajectory score as the optimal trajectory.

Figure 6:
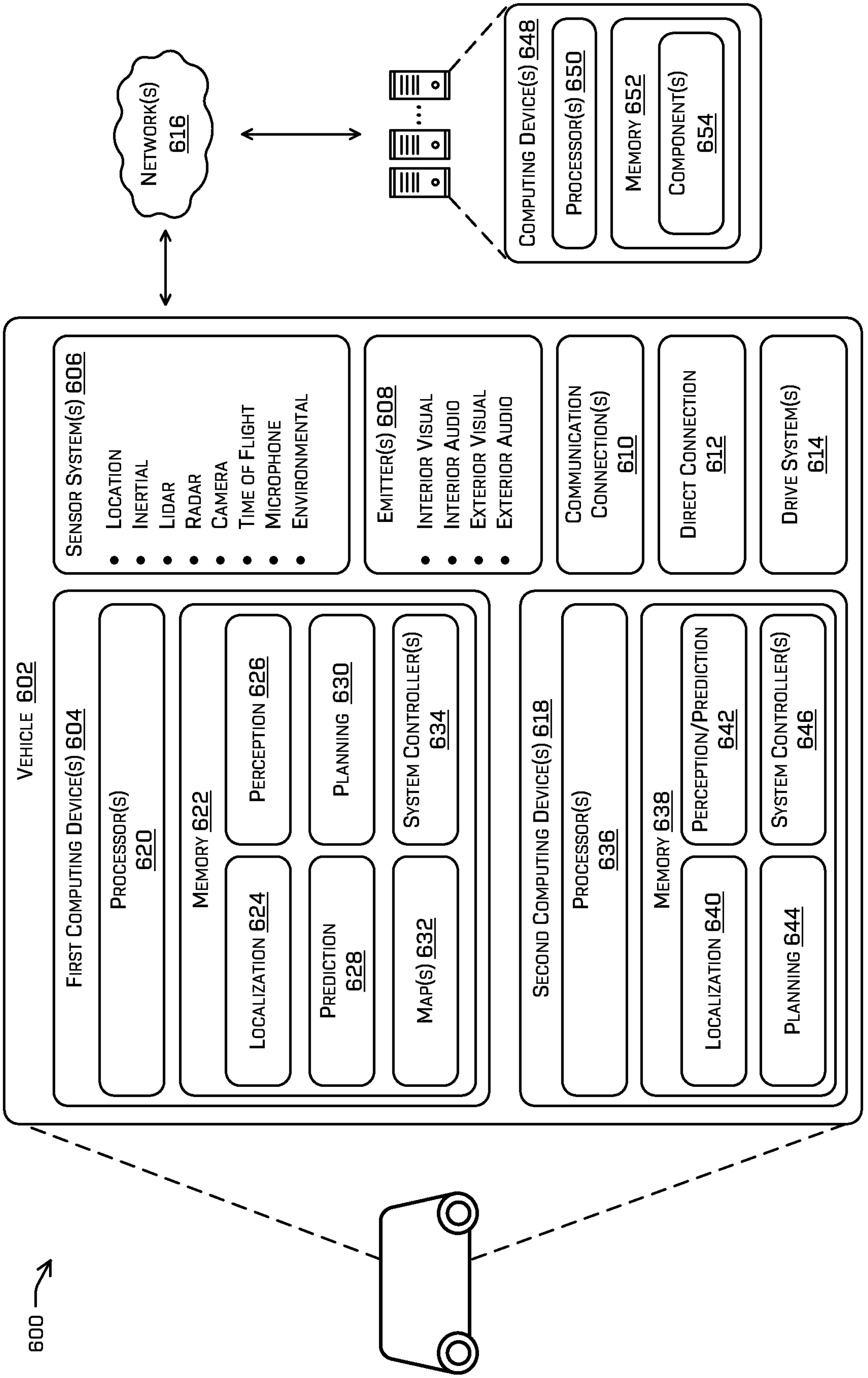
FIG. 6 is a block diagram of an example system for implementing the techniques described herein.

At operation 514, the process 500 controls the vehicle based on the candidate action evaluation(s). In some cases, controlling the vehicle based on the candidate action evaluation includes selecting the optimal candidate action (e.g., the candidate action with the least cost FIG. 6 is a block diagram of an example system 600 for implementing the techniques described herein. In at least one example, the system 600 can include a vehicle 602. In the illustrated example system 600, the vehicle 602 is an autonomous vehicle; however, the vehicle 602 can be any other type of vehicle.

The vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 can include one or more first computing devices 604, one or more sensor systems 606, one or more emitters 608, one or more communication connections 610 (also referred to as communication devices and/or modems), at least one direct connection 612 (e.g., for physically coupling with the vehicle 602 to exchange data and/or to provide power), and one or more drive systems 614. The one or more sensor systems 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of each of these or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the first computing device(s) 604.

The vehicle 602 can also include emitter(s) 608 for emitting light and/or sound. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include communication connection(s) 610 that enable communication between the vehicle 602 and one or more other local or remote computing device(s) (e.g., a remote teleoperation computing device) or remote services. For instance, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, etc.).

The communications connection(s) 610 can include physical and/or logical interfaces for connecting the first computing device(s) 604 to another computing device or one or more external networks 616 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include the sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more components to perform various functionalities of the drive system(s) 614. Furthermore, the drive system(s) 614 also include one or more communication connection(s) that enable communication by the respective drive system with one or more other local or remote computing device(s).

The vehicle 602 can include one or more second computing devices 618 to provide redundancy, error checking, and/or validation of determinations and/or commands determined by the first computing device(s) 604.

By way of example, the first computing device(s) 604 may be considered to be a primary system, while the second computing device(s) 618 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 604 can include one or more processors 620 and memory 622 communicatively coupled with the one or more processors 620. In the illustrated example, the memory 622 of the first computing device(s) 604 stores a localization component 624, a perception component 626, a prediction component 628, a planning component 630, a maps component 632, and one or more system controllers 634. Though depicted as residing in the memory 622 for illustrative purposes, it is contemplated that the localization component 624, the perception component 626, the prediction component 628, the planning component 630, the maps component 632, and the one or more system controllers 634 can additionally, or alternatively, be accessible to the first computing device(s) 604 (e.g., stored in a different component of vehicle 602 and/or be accessible to the vehicle 602 (e.g., stored remotely).

In memory 622 of the first computing device 604, the localization component 624 can include functionality to receive data from the sensor system(s) 606 to determine a position of the vehicle 602. For example, the localization component 624 can include and/or request/receive a three-dimensional map of an environment (and/or a map based on semantic objects) and can continuously determine a location of the autonomous vehicle within the map. In some instances, the localization component 624 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 624 can provide data to various components of the vehicle 602 to determine an initial position of an autonomous vehicle for generating a trajectory, as discussed herein.

The perception component 626 can include functionality to perform object detection, segmentation, and/or classification. In some examples, the perception component 626 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional or alternative examples, the perception component 626 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 626 can use perception algorithms to determine a perception-based bounding box associated with an object in the environment based on sensor data. For example, the perception component 626 can receive image data and classify the image data to determine that an object is represented in the image data. Then, using detection algorithms, the perception component 626 can generate a two-dimensional bounding box and/or a perception-based three-dimensional bounding box associated with the object. The perception component 626 can further generate a three-dimensional bounding box associated with the object. As discussed above, the three-dimensional bounding box can provide additional information such as a location, orientation, pose, and/or size (e.g., length, width, height, etc.) associated with the object.

The perception component 626 can include functionality to store perception data generated by the perception component 626. In some instances, the perception component 626 can determine a track corresponding to an object that has been classified as an object type. For purposes of illustration only, the perception component 626, using sensor system(s) 606 can capture one or more images of an environment. The sensor system(s) 606 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 602. Fused perception data can include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 628 can generate one or more probability maps representing prediction probabilities of possible locations of one or more objects in an environment. For example, the prediction component 628 can generate one or more probability maps for vehicles, pedestrians, animals, and the like within a threshold distance from the vehicle 602. In some instances, the prediction component 628 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment. In examples, the prediction component 628 generates one or more predicted object trajectories, such as the object trajectories 206 of FIG. 2.

The planning component 630 can determine a path for the vehicle 602 to follow to traverse through an environment. For example, the planning component 630 can determine various routes and paths and various levels of detail. In some instances, the planning component 630 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 630 can generate an instruction for guiding the autonomous vehicle along at least a portion of the route from the first location to the second location. In at least one example, the planning component 630 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 630 can alternatively, or additionally, use data from the perception component 626 and/or the prediction component 628 to determine a path for the vehicle 602 to follow to traverse through an environment. For example, the planning component 630 can receive data from the perception component 626 and/or the prediction component 628 regarding objects associated with an environment. Using this data, the planning component 630 can determine a route to travel from a first location (e.g., a current location) to a second location (e.g., a target location) to avoid objects in an environment. In at least some examples, such a planning component 630 may determine there is no such collision free path and, in turn, provide a path which brings vehicle 602 to a safe stop avoiding all collisions and/or otherwise mitigating damage.

The memory 622 can further include one or more maps 632 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual “surfels” (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 632 can include at least one map (e.g., images and/or a mesh). In some examples, the vehicle 602 can be controlled based at least in part on the map(s) 632. That is, the map(s) 632 can be used in connection with the localization component 624, the perception component 626, the prediction component 628, and/or the planning component 630 to determine a location of the vehicle 602, identify objects in an environment, generate prediction probabilit(ies) associated with objects and/or the vehicle 602, and/or generate routes and/or trajectories to navigate within an environment.

In some examples, the one or more maps 632 can be stored on a remote computing device(s) (such as the computing device(s) 648) accessible via network(s) 616. In some examples, multiple maps 632 can be stored based on, for example, a characteristic (e.g., type of entity, time of day, day of week, season of the year, etc.). Storing multiple maps 632 can have similar memory requirements but can increase the speed at which data in a map can be accessed.

In at least one example, the first computing device(s) 604 can include one or more system controller(s) 634, which can be configured to control steering, propulsion, braking, safety, emitters, communication, and other systems of the vehicle 602. These system controller(s) 634 can communicate with and/or control corresponding systems of the drive system(s) 614 and/or other components of the vehicle 602, which may be configured to operate in accordance with a path provided from the planning component 630.

The second computing device(s) 618 can comprise one or more processors 636 and memory 638 including components to verify and/or control aspects of the vehicle 602, as discussed herein. In at least one instance, the one or more processors 636 can be similar to the processor(s) 620 and the memory 638 can be similar to the memory 622. However, in some examples, the processor(s) 636 and the memory 638 may comprise different hardware than the processor(s) 620 and the memory 622 for additional redundancy.

In some examples, the memory 638 can comprise a localization component 640, a perception/prediction component 642, a planning component 644, and one or more system controllers 646.

In some examples, the localization component 640 may receive sensor data from the sensor(s) 606 to determine one or more of a position and/or orientation (together a pose) of the autonomous vehicle 602. Here, the position and/or orientation may be relative to point(s) and/or object(s) in an environment in which the autonomous vehicle 602 is located. In examples, the orientation may include an indication of a yaw, roll, and/or pitch of the autonomous vehicle 602 relative to a reference plane and/or relative to point(s) and/or object(s). In examples, the localization component 640 may perform less processing than the localization component 624 of the first computing device(s) 604 (e.g., higher-level localization). For instance, the localization component 640 may not determine a pose of the autonomous vehicle 602 relative to a map, but merely determine a pose of the autonomous vehicle 602 relative to objects and/or surfaces that are detected around the autonomous vehicle 602 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 642 can include functionality to detect, identify, classify, and/or track object(s) represented in sensor data. For example, the perception/prediction component 642 can perform the clustering operations and operations to estimate or determine connectivity data associated with data points, as discussed herein.

In some examples, the perception/prediction component 642 may comprise an M-estimator, but may lack an object classifier such as, for example, a neural network, decision tree, and/or the like for classifying objects. In additional or alternate examples, the perception/prediction component 642 may comprise an ML model of any type, configured to disambiguate classifications of objects. By contrast, the perception component 626 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 642 (and/or 626) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 642 may also process the input data to determine one or more predicted trajectories for an object. For example, based on a current position of an object and a velocity of the object over a period of a few seconds, the perception/prediction component 642 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 644 can include functionality to receive a trajectory from the planning component 630 to validate that the trajectory is free of collisions and/or is within safety margins. In some examples, the planning component 644 can generate a safe stop trajectory (e.g., a trajectory to stop the vehicle 602 with a "comfortable" deacceleration (e.g., less than maximum deceleration)) and in some examples the planning component 644 can generate an emergency stop trajectory (e.g., maximum deceleration with or without steering inputs). In examples, the planning component 644 performs operations of at least one of FIG. 1, FIG. 3, or FIG. 5. In examples, the planning component 644 generates a linear array, for example using the operations of the second processing unit 204 as depicted in FIG. 2.

In some examples, the system controller(s) 646 can include functionality to control safety critical components (e.g., steering, braking, motors, etc.) of the vehicle. In this manner, the second computing device(s) 618 can provide redundancy and/or an additional hardware and software layer for vehicle safety.

The vehicle 602 can connect to computing device(s) 648 via the network 616 and can include one or more processors 650 and memory 652 communicatively coupled with the one or more processors 650. In at least one instance, the one or more processors 650 can be similar to the processor(s) 620 and the memory 652 can be similar to the memory 622. In the illustrated example, the memory 652 of the computing device(s) 648 stores a component(s) 654, which may correspond to any of the components discussed herein.

The processor(s) 620, 636, and/or 650 can be any suitable processor capable of executing instructions to process data and perform operations as described herein. By way of example and not limitation, the processor(s) 620, 636, and/or 650 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 622, 638, and/or 652 are examples of non-transitory computer-readable media. The memory 622, 638, and/or 652 can store an operating system and one or more software applications, instructions, programs, and/or data to implement the methods described herein and the functions attributed to the various systems. In various implementations, the memory 622, 638, and/or 652 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 622, 638, and/or 652 can be implemented as a neural network. In some examples, the components in the memory 622, 638, and/or 652 may not include machine learning algorithm to reduce complexity and to be verified and/or certified from a safety standpoint.

As described herein, an exemplary neural network is an algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 6 may utilize the processes and flows of FIGS. 1-3 and 5.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: a first processing unit and a second processing unit; and one or more non-transitory computer-readable media storing computer-executable instructions that, when executed, cause the first processing unit and the second processing unit to collectively perform operations comprising: receiving a set of candidate actions for an autonomous vehicle; determining, based at least in part on the set of candidate actions, a region of interest proximate the autonomous vehicle; receiving prediction data comprising a set of predicted trajectories associated with a set of objects in an environment; transmitting the prediction data to the second processing unit; determining, by the second processing unit and based at least in part on the set of predicted trajectories, a linear array indicative of occupancy data associated with the set of objects; querying, at the second processing unit and based at least in part on a proposed portion of a trajectory, the linear array; receiving, in response to querying the linear array, occupancy data; and controlling the autonomous vehicle based on the occupancy data.

B: The system of paragraph A, wherein querying the linear array comprises: determining a plurality of proposed waypoints associated with a proposed portion of a trajectory for the autonomous vehicle to follow; determining, for a proposed waypoint of the plurality of proposed waypoints, a potential intersection region around the proposed waypoint, the proposed waypoint associated with a time; and determining, based at least in part on the linear array, whether an object is within the potential intersection region at the time.

C: The system of paragraph A or B, wherein determining the linear array comprises: determining, for the set of predicted trajectories, a set of identifiers, an identifier of the set of identifiers comprising a time, a position comprising a two-dimensional location within a grid defined by the region of interest and determined based at least in part on an associated predicted trajectory, and a state identifier indicative of the associated predicted trajectory; sorting the set of identifiers based on the time and the position; determining, based at least in part on the set of identifiers, a subset of identifiers having a same time and a same position; and storing, within the linear array, an indication of the subset of identifiers.

D: The system of paragraph C, the operations further comprising: storing an indication of a first identifier in the subset, wherein the indication of the first identifier represents the time, the position, and the state identifier associated with the first identifier.

E: The system of paragraph C or D, the operations further comprising: determining, by the second processing unit, the grid based at least in part on: determining an occupancy value for a cell of the grid based at least in part on the set of predicted trajectories and a size of an object.

F: One or more non-transitory computer-readable media storing instructions executable by a first processing unit and a second processing unit, wherein the instructions, when executed, cause the first processing unit and the second processing unit to collectively perform operations comprising: receiving a set of candidate actions for a vehicle; determining, based at least in part on the set of candidate actions, a region of interest proximate the vehicle; transmitting, from the first processing unit to the second processing unit, prediction data comprising a set of predicted trajectories associated with a set of objects in the region of interest; determining, by the second processing unit and based at least in part on the set of predicted trajectories, a linear array indicative of occupancy data of the set of objects; and controlling the vehicle based on the linear array.

G: The one or more non-transitory computer-readable media of paragraph F, wherein determining the linear array comprises: determining, for the set of predicted trajectories, a set of identifiers, an identifier of the set of identifiers comprising a time, a position comprising a two-dimensional location within a grid defined by the region of interest and determined based at least in part on an associated predicted trajectory, and a state identifier indicative of the associated predicted trajectory; sorting the set of identifiers based on the time and the position; determining, based at least in part on the set of identifiers, a subset of identifiers having a same time and a same position; and storing, within the linear array, an indication of the subset of identifiers.

H: The one or more non-transitory computer-readable media of paragraph G, the operations further comprising: storing a second indication of a first identifier in the subset, wherein the second indication of the first identifier represents the time, the position, and the state identifier associated with the first identifier.

I: The one or more non-transitory computer-readable media of paragraph H, further comprising: storing a third indication of the associated predicted trajectory for the first identifier in the subset.

J: The one or more non-transitory computer-readable media of any of paragraphs F-I, wherein the first processing unit is a central processing unit and the second processing unit is a parallel processing unit.

K: The one or more non-transitory computer-readable media of any of paragraphs F-J, wherein controlling the vehicle based on the linear array comprises: querying, at the second processing unit and based at least in part on a proposed portion of a trajectory, the linear array; receiving, in response to querying the linear array, occupancy data; and controlling the vehicle based on the occupancy data.

L: The one or more non-transitory computer-readable media of paragraph K, wherein controlling the vehicle based on the occupancy data comprises: determining whether to validate the proposed portion based on the occupancy data; and controlling the vehicle based on whether the proposed portion is validated.

M: The one or more non-transitory computer-readable media of paragraph K or L, wherein querying the linear array comprises: determining a plurality of proposed waypoints associated with the proposed portion for the vehicle to follow; determining, for a proposed waypoint of the plurality of proposed waypoints, a potential intersection region around the proposed waypoint, the proposed waypoint associated with a time; and determining, based at least in part on the linear array, whether an object is within the potential intersection region at the time.

N: A method comprising: receiving a set of candidate actions for a vehicle; determining, based at least in part on the set of candidate actions, a region of interest proximate the vehicle; transmitting, from a first processing unit to a second processing unit, prediction data comprising a set of predicted trajectories associated with a set of objects in the region of interest; determining, by the second processing unit and based at least in part on the set of predicted trajectories, a linear array indicative of occupancy data of the set of objects; and controlling the vehicle based on the linear array.

O: The method of paragraph N, wherein determining the linear array comprises: determining, for the set of predicted trajectories, a set of identifiers, an identifier of the set of identifiers comprising a time, a position comprising a two-dimensional location within a grid defined by the region of interest and determined based at least in part on an associated predicted trajectory, and a state identifier indicative of the associated predicted trajectory; sorting the set of identifiers based on the time and the position; determining, based at least in part on the set of identifiers, a subset of identifiers having a same time and a same position; and storing, within the linear array, an indication of the subset of identifiers.

P: The method of paragraph O, further comprising: storing a second indication of a first identifier in the subset, wherein the second indication of the first identifier represents the time, the position, and the state identifier associated with the first identifier.

Q: The method of paragraph P, further comprising: storing a third indication of the associated predicted trajectory for the first identifier in the subset.

R: The method of any of paragraphs N-Q, wherein the first processing unit is a central processing unit and the second processing unit is a parallel processing unit.

S: The method of any of paragraphs N-R, wherein controlling the vehicle based on the linear array comprises: querying, at the second processing unit and based at least in part on a proposed portion of a trajectory, the linear array; receiving, in response to querying the linear array, occupancy data; and controlling the vehicle based on the occupancy data.

T: The method of paragraph S, wherein controlling the vehicle based on the occupancy data comprises: determining whether to validate the proposed portion based on the occupancy data; and controlling the vehicle based on whether the proposed portion is validated.

What is claimed is:

1. A system comprising:

a first processing unit and a second processing unit; and one or more non-transitory computer-readable media storing computer-executable instructions that, when executed, cause the first processing unit and the second processing unit to collectively perform operations comprising:

receiving a set of candidate actions for an autonomous vehicle;

determining, based at least in part on the set of candidate actions, a region of interest proximate the autonomous vehicle;

receiving prediction data comprising a set of predicted trajectories associated with a set of objects in an environment;

transmitting the prediction data to the second processing unit;

determining, by the second processing unit and based at least in part on the set of predicted trajectories, a first linear array, wherein:

a first element of the first linear array references first data stored in a second linear array, the first data identifying a first predicted state of a first object of the set of objects at a time, the first element of the first linear array further references second data stored in the second linear array, the second data identifying a second predicted state of a second object of the set of objects at the time, the first object is predicted to occupy a position at the time based on a first predicted trajectory of the set of predicted trajectories, the position comprising a two-dimensional location within a grid defined by the region of interest, the second object is predicted to occupy the position at the time based on a second predicted trajectory of the set of predicted trajectories, and the first element of the first linear array references the first data and the second data based at least in part on the position and the time;

querying, at the second processing unit and based at least in part on a proposed portion of a trajectory, the first linear array;

receiving, in response to querying the first linear array, occupancy data; and controlling the autonomous vehicle based on the occupancy data.

2. The system of claim 1, wherein querying the first linear array comprises:

determining a plurality of proposed waypoints associated with the proposed portion for the autonomous vehicle to follow;

determining, for a proposed waypoint of the plurality of proposed waypoints, a potential intersection region around the proposed waypoint, the proposed waypoint associated with a time; and determining, based at least in part on the first linear array, whether an object is within the potential intersection region at the time.

3. The system of claim 1, wherein determining the first linear array comprises:

determining, for the set of predicted trajectories, a set of identifiers, an identifier of the set of identifiers comprising the time, the position, and a state identifier indicative of the first predicted state, wherein:

the position is determined based at least in part on the first predicted trajectory, and the set of identifiers is stored in the second linear array;

sorting the set of identifiers based on the time and the position;

determining, based at least in part on the set of identifiers, a subset of identifiers having a same time and a same position; and determining, based at least in part on the subset of identifiers, that the first element of the first linear array references the subset of identifiers.

4. The system of claim 3, wherein determining that the first element of the first linear array references the subset of identifiers comprises:

determining an indication of a first identifier in the subset, wherein:

the first element of the first linear array comprises the time and the position, and the indication of the first identifier represents the time, the position, and the state identifier associated with the first identifier.

5. The system of claim 3, the operations further comprising:

determining, by the second processing unit, the grid based at least in part on:

determining an occupancy value for a cell of the grid based at least in part on the set of predicted trajectories and a size of an object.

6. One or more non-transitory computer-readable media storing instructions executable by a first processing unit and a second processing unit, wherein the instructions, when executed, cause the first processing unit and the second processing unit to collectively perform operations comprising:

receiving a set of candidate actions for a vehicle;

determining, based at least in part on the set of candidate actions, a region of interest proximate the vehicle;

transmitting, from the first processing unit to the second processing unit, prediction data comprising a set of predicted trajectories associated with a set of objects in the region of interest; determining, by the second processing unit and based at least in part on the set of predicted trajectories, a first linear array, wherein:

a first element of the first linear array references first data stored in a second linear array, the first data identifying a first predicted state associated with a first object of the set of objects at a time, the first object is predicted to occupy a position at the time based on a first predicted trajectory of the set of predicted trajectories, the first element of the first linear array further references second data identifying a second predicted state associated with a second object of the set of objects at the time, and the second object is predicted to occupy the position at the time based on a second predicted trajectory of the set of predicted trajectories; and controlling the vehicle based on the first linear array.

7. The one or more non-transitory computer-readable media of claim 6, wherein determining the first linear array comprises:

determining, for the set of predicted trajectories, a set of identifiers, an identifier of the set of identifiers comprising the time, the position, and a state identifier indicative of the first predicted state, wherein:

the position comprises a two-dimensional location within a grid defined by the region of interest, the position is determined based at least in part on the first predicted trajectory, and the set of identifiers is stored in the second linear array;

sorting the set of identifiers based on the time and the position;

determining, based at least in part on the set of identifiers, a subset of identifiers having a same time and a same position; and determining, based at least in part on the subset of identifiers, that the first element of the first linear array references the subset of identifiers.

8. The one or more non-transitory computer-readable media of claim 7, the operations further comprising:

storing, as the first data, an indication of a first identifier in the subset, wherein the indication of the first identifier represents the time, the position, and the state identifier associated with the first identifier.

9. The one or more non-transitory computer-readable media of claim 8, further comprising:

storing a third indication of the first predicted trajectory in the subset.

10. The one or more non-transitory computer-readable media of claim 6, wherein the first processing unit is a central processing unit and the second processing unit is a parallel processing unit.

11. The one or more non-transitory computer-readable media of claim 6, wherein controlling the vehicle based on the first linear array comprises:

querying, at the second processing unit and based at least in part on a proposed portion of a trajectory, the first linear array;

receiving, in response to querying the first linear array, occupancy data; and controlling the vehicle based on the occupancy data.

12. The one or more non-transitory computer-readable media of claim 11, wherein controlling the vehicle based on the occupancy data comprises:

determining whether to validate the proposed portion based on the occupancy data; and controlling the vehicle based on whether the proposed portion is validated.

13. The one or more non-transitory computer-readable media of claim 11, wherein querying the first linear array comprises:

determining a plurality of proposed waypoints associated with the proposed portion for the vehicle to follow;

determining, for a proposed waypoint of the plurality of proposed waypoints, a potential intersection region around the proposed waypoint, the proposed waypoint being associated with the time; and determining, based at least in part on the first linear array, whether an object is within the potential intersection region at the time.

14. A method comprising:

receiving a set of candidate actions for a vehicle;

determining, based at least in part on the set of candidate actions, a region of interest proximate the vehicle;

transmitting, from a first processing unit to a second processing unit, prediction data comprising a set of predicted trajectories associated with a set of objects in the region of interest;

determining, by the second processing unit and based at least in part on the set of predicted trajectories, a first linear array, wherein:

a first element of the first linear array references first data stored in a second linear array, the first data identifying a first predicted state associated with a first object of the set of objects at a time, the first element of the first linear array further references second data stored in the second linear array, the second data identifying a second predicted state associated with a second object of the set of objects at the time, the first object is predicted to occupy a position at the time based on a first predicted trajectory of the set of predicted trajectories, and the second object is predicted to occupy the position at the time based on a second predicted trajectory of the set of predicted trajectories; and controlling the vehicle based on the first linear array.

15. The method of claim 14, wherein determining the first linear array comprises:

determining, for the set of predicted trajectories, a set of identifiers, an identifier of the set of identifiers comprising the time, the position, and a state identifier indicative of the first predicted state, wherein:

the position comprises a two-dimensional location within a grid defined by the region of interest, is determined based at least in part on the first predicted trajectory, and the set of identifiers is stored in the second linear array;

sorting the set of identifiers based on the time and the position;

determining, based at least in part on the set of identifiers, a subset of identifiers having a same time and a same position; and determining, based at least in part on the subset of identifiers, that the first element of the first linear array references the subset of identifiers.

16. The method of claim 15, further comprising:

storing, as the first data, a first identifier in the subset, wherein the first identifier comprises the time, the position, and the state identifier associated with the first identifier.

17. The method of claim 14, wherein the first processing unit is a central processing unit and the second processing unit is a parallel processing unit.

18. The method of claim 14, wherein controlling the vehicle based on the first linear array comprises:

querying, at the second processing unit and based at least in part on a proposed portion of a trajectory, the first linear array;

receiving, in response to querying the first linear array, occupancy data; and controlling the vehicle based on the occupancy data.

19. The method of claim 18, wherein controlling the vehicle based on the occupancy data comprises:

determining whether to validate the proposed portion based on the occupancy data; and controlling the vehicle based on whether the proposed portion is validated.

20. The system of claim 1, wherein:

the first data is a first element of the second linear array;

the first element of the second linear array indicates a first defined state of a plurality of defined states;

state data for each state of the plurality of defined states is stored in a third linear array;

the first predicted state of the first element of the first linear array is the first defined state; and the occupancy data received in response to querying the first linear array is based at least in part on the first element of the second linear array indicating the first defined state and the occupancy data includes a portion of the state data stored in the third linear array for the first defined state.

* * * * *